US006993173B2

(12) United States Patent
Zuzan et al.

(10) Patent No.: US 6,993,173 B2
(45) Date of Patent: Jan. 31, 2006

(54) METHODS FOR ESTIMATING PROBE CELL LOCATIONS IN HIGH-DENSITY SYNTHETIC DNA MICROARRAYS

(75) Inventors: Harry Zuzan, Pleasant Hill, CA (US); Valen E. Johnson, Ann Arbor, MI (US)

(73) Assignee: Duke University, Durham, NC (US)

( * ) Notice: Subject to any disclaimer, the term of this patent is extended or adjusted under 35 U.S.C. 154(b) by 619 days.

(21) Appl. No.: 10/262,488

(22) Filed: Sep. 30, 2002

(65) Prior Publication Data
US 2003/0073896 A1    Apr. 17, 2003

Related U.S. Application Data

(60) Provisional application No. 60/329,025, filed on Oct. 12, 2001.

(51) Int. Cl.
G06K 9/00    (2006.01)
(52) U.S. Cl. .......................................... 382/129; 435/6
(58) Field of Classification Search ................ 382/128, 382/129, 130, 131, 132, 133, 134; 600/352, 600/407, 427, 562; 424/1.11, 1.17, 1.41, 424/1.45; 435/5, 6, 69.1, 91.4, 333, 252.3, 435/477; 436/94, 63, 508, 519.22; 702/20, 702/27, 47
See application file for complete search history.

(56) References Cited

U.S. PATENT DOCUMENTS

| | | | |
|---|---|---|---|
| 5,143,854 A | 9/1992 | Pirrung et al. ............... 436/518 |
| 5,384,261 A | 1/1995 | Winkler et al. .............. 436/518 |
| 5,593,839 A * | 1/1997 | Hubbell et al. ................. 435/6 |
| 5,631,734 A | 5/1997 | Stern et al. ................... 356/317 |
| 5,795,716 A | 8/1998 | Chee et al. ...................... 435/6 |
| 5,837,832 A | 11/1998 | Chee et al. ................. 536/22.1 |
| 5,856,101 A | 1/1999 | Hubbell et al. ................. 435/6 |
| 5,856,174 A | 1/1999 | Lipshutz et al. .......... 435/286.5 |
| 5,874,219 A * | 2/1999 | Rava et al. ...................... 435/6 |
| 5,919,523 A | 7/1999 | Sundberg et al. .............. 427/33 |
| 5,945,334 A | 8/1999 | Besemer et al. .......... 435/287.2 |
| 5,959,098 A | 9/1999 | Goldberg et al. ........... 536/25.3 |
| 6,083,697 A | 7/2000 | Beecher et al. ................. 435/6 |
| 6,090,555 A | 7/2000 | Fiekowsky et al. ............. 435/6 |
| D430,024 S | 8/2000 | Besemer et al. ............. D9/430 |
| 6,140,044 A | 10/2000 | Besemer et al. ................ 435/6 |
| 6,141,096 A | 10/2000 | Stern et al. ................... 356/318 |
| 6,150,147 A | 11/2000 | Goldberg et al. ......... 435/173.1 |
| 6,153,743 A | 11/2000 | Hubbell et al. ............. 536/25.3 |
| 6,188,783 B1 * | 2/2001 | Balaban et al. ............. 382/129 |
| 6,242,180 B1 | 6/2001 | Chee .............................. 435/6 |

(Continued)

FOREIGN PATENT DOCUMENTS

| | | |
|---|---|---|
| WO | WO 99/08233 | 2/1999 |
| WO | WO 01/5776 A2 | 8/2001 |

OTHER PUBLICATIONS

Buhler et al., *Dapple: Improved Techniques for Finding spots on DNA Microarrays*, UW CSE Technical Report UWTR, pp. 1-12, Aug. 5, 2000.

(Continued)

*Primary Examiner*—Kanjibhai Patel
*Assistant Examiner*—Abolfazl Tabatabai
(74) *Attorney, Agent, or Firm*—Myers Bigel Sibley & Sajovec PA

(57) ABSTRACT

Methods, systems, and computer program products for estimating the location of a probe cell in an image of a high-density microarray DNA chip interrogate a plurality of different closely spaced estimated locations to identify the most likely estimated location of the probe cell in the image.

37 Claims, 16 Drawing Sheets

U.S. PATENT DOCUMENTS 6,571,005 B1 * 5/2003 Li et al. ..................... 382/133
6,852,490 B2 * 2/2005 Gentalen et al. ............... 435/6

OTHER PUBLICATIONS

Chen et al., *Ratio-Based Decisions and the Quantitative Analysis of cDNA Microarray Images*, Journal of Biomedical Optics, vol. 2, No. 4, pp. 364-374, Oct. 1997.

Schadt et al., *Analyzing High-Density Oligonucleotide Gene Expression Array Data*, Journal of Cellular Biochemistry 80, pp. 192-202, 2000.

Zuzan et al., *Estimation of Probe Cell Locations in High-density Synthetic-oligonucleotide DNA Microarrays*, pp 1-17, Oct. 16, 2001.

PCT International Search Report, International Application No. PCT/US02/312846 mailed Nov. 18, 2004.

Thijs G et al: *A Gibbs Sampling Method To Detect Over-Represented Motifs In The Upstream Regions Of Co-Expressed Genes*, XP000988082, pp. 305-312, Apr. 22, 2001.

Kuklin A et al: *High Throughput Screening Of Gene Expression Signatures*, XP001095704, pp. 41-46, 2000.

Johnson et al., Metropolis-Hastings Sampling, *Ordinal Data Modeling*, Apr., 1999, pp. 54-58 (Springer-Verlag, New York (1999).

Johnson et al., Gibbs Sampling, *Ordinal Data Modeling*, Apr., 1999, pp. 58-65 (Springer-Verlag, New York (1999).

Johnson et al., Posterior Optimization, *Ordinal Data Modeling*, Apr., 1999, pp. 226 (Springer-Verlag, New York (1999).

Li, et al. *Model-based analysis of oligonucleotide arrays: Expression index computation and outlier detection*, 908 PNAS, p. 31-36 (2001).

Lipshutz et al., *High density synthetic oligonucleotide arrays*, 21 Nature Genetics, pp. 20-24 (1999).

Lockart et al., *Expression monitoring by hypbridization to high-density oligonucleotide arrays*, 14 Nature Biotechnology, pp. 1675-1680 (1996).

Southern et al., *Molecular interactions on microarrays*, 21 Nature Genetics, pp. 5-9 (1999).

* cited by examiner

METHODS FOR ESTIMATING PROBE CELL LOCATIONS IN HIGH-DENSITY SYNTHETIC DNA MICROARRAYS

RELATED APPLICATIONS

This application claims priority from U.S. Provisional Patent Application Ser. No. 60/329,025, filed Oct. 12, 2001, the contents of which are hereby incorporated by reference as if recited in full herein.

This invention was made with Government support under Grant No. CA68438 awarded by the National Institutes of Health and with Government support under Grant No. 9711365 awarded by the National Science Foundation. The government has certain rights in the invention.

FIELD OF THE INVENTION

The present invention relates to methods for identifying cell locations in an image of a DNA microarray such as a High-Density Synthetic-oligonucleotide DNA Microarray ("HDSM").

BACKGROUND OF THE INVENTION

Rapid extraction of data from DNA microarrays can provide researchers with important information regarding biological processes. One type of DNA microarray used to obtain gene expression data is an HDSM. One commercially available microarray is called a GeneChip® manufactured by Affymetrix, Inc. of Santa Clara, Calif.

Technology used to produce HDSM's have now miniaturized the size of the surface area used to hybridize an RNA or DNA sample to DNA probes. For example, one HSDM may employ about 300,000–400,000 (or more) different DNA probe sequences for a single hybridization, all within a 1.28 cm×1.28 cm region (hence, the term "microarray"). Densely packed oligonucleotides of a given probe sequence are localized on the microarray within a region termed a "probe cell". Thus, typical HDSM's contain about 300,000–400,000 probe cells with homogeneous probe sequences within each probe cell. See Lockhart et al., *Expression monitoring by hybridization to high-density oligonucleotide arrays,* 14 Nature Biotechnology, pp. 1675–1680 (1996); and Lipshutzet al., *High-density synthetic oligonucleotide arrays,* 21 Nature Genetics, pp. 20–24 (1999).

In operation, a sample of fluorescent labeled DNA or RNA is hybridized to DNA probes on an HSDM. The hybridization data is extracted by an image system that records the intensity of fluorescence at a discrete number of positions on the HSDM. These positions are laid out in a lattice that can be represented by an array of uniformly sized squares and the corresponding intensities associated with these squares can be used to form an image constructed from pixels. These intensities of fluorescence represent photon counts and are intrinsically non-negative scalars. Typically, these intensities are recorded as a large array of 16 bit unsigned integers and the corresponding image is displayed using grayscale pixels.

An example of an HSDM image at low resolution can be seen in FIG. 1. In FIG. 2, a 100×100 pixel region of the image shown in FIG. 1 is illustrated at a higher resolution. From the image shown at FIG. 2, it can be seen how the probe cells are regularly spaced in a rectangular grid. In the images shown, each probe cell occupies an area that is approximately 8×8 pixels.

The approximate number of pixels in a probe cell will depend on the size of the probe cell on the physical HSDM as well as the resolution at which the HSDM surface was scanned when the hybridization data was extracted. It is not known prior to scanning which area of the physical HSDM surface a given pixel will represent. Allocation of pixel intensities to probe cells (such as via photon counts to probe cells) can be performed using a post-processing operation on the extracted image data. Operatively, an image-processing algorithm is used to estimate the location of each probe cell with respect to the grid of pixels. Using these estimated locations, it is possible to estimate probe cell boundaries and allocate the intensity of individual pixels to probe cells. To accurately or reliably allocate pixel intensities to probe cells, probe cell locations should be substantially accurately estimated. Hence, in order to obtain reliable probe cell data from raw pixel data, accurate estimation of probe cell locations is important.

Unfortunately, the miniaturization of probe cells can complicate probe cell location estimation in the image. To obtain reliable data, the estimate of a probe cell's location is important as it impacts the numerical summary of intensity data for probe cells, which consequently impacts the inference on gene expression.

It is believed that the conventional method used to allocate pixel intensities to probe cells is to obtain a fixed estimate of probe cell locations. Then, for each probe cell, its fixed location is used to select pixels that are deemed to be interior to the probe cell. These interior pixels are allocated to the probe cell and their intensities are summarized.

In the past, to summarize a hybridization, it is believed that the image analysis methods of Affymetrix reports three statistics for each probe cell: (1) the number of pixels belonging to the probe cell; (2) a number describing the probe cell response (the default choice of this number is believed to be the 75th percentile of the probe cell's pixel intensities); and (3) the standard deviation of the probe cell's pixel intensities.

In order to understand the relationship between a pixel intensity and the physical region of the HSDM it represents, recall that there is a distinction between the image of an HSDM and the physical HSDM the image represents. The physical HSDM is segmented. On the HSDM surface, neighboring probe cells do not overlap. However, the image of an HSDM is not segmented. The region of the physical HSDM that a pixel represents may be entirely within a probe cell but may straddle as many as four probe cells. A pixel could also represent a region partly or entirely in the border area surrounding the array of probe cells. Evident in typical HSDM images is the effect of what can be described as a blurring process, each pixel can lose signal to pixels nearby. Intensities of pixels representing regions on or near the perimeter of probe cells can be the most affected by the blurring process and/or the lack of segmentation, in the sense that the signal captured in the intensity of one of these pixels cannot be almost entirely attributed to signal from a single probe cell. Even though the array of probe cells on the physical HSDM might be able be laid out on a near perfect lattice, this lattice may be deformed on the scanned image. As a consequence of the disparities between an HSDM and its image, any model or algorithm that does recognize the distinction between an HSDM and its image, may inaccurately attribute pixel intensities to probe cells without recognizing these phenomena and/or the extent to which they can distort the resulting hybridization summaries.

In view of the above, there remains a need for improved image processing methods that can estimate or identify the probe cell locations on DNA or RNA microarrays.

SUMMARY OF THE INVENTION

The present invention provides methods for improved probe cell location estimation in an image of an HSDM. The present invention can also provide improved hybridization summaries by improving the estimation of the probe cell locations. This, in turn, may more accurately attribute signal from pixels to probe cells. The methods of the present invention can provide, for example, improved summaries of individual probe cells, improved hybridization summaries, and improved reproducibility of hybridization summaries.

The present invention provides image-processing methods for assessing, analyzing or manipulating hybridization image intensity data based on image intensity data that is extracted from a microarray which can be correlated or contrasted to the physical design of the microarray. The image processing methods can analyze the intensity data presented in an image scan of the detected fluorescence of the probe array (as a post-expression, post-initial image acquisition step) based on the estimated probe cell locations. In particular embodiments, the present invention provides improved estimates of the location of the center of the probe cells (and recognizes that there is a difference between an HSDM and its image) and/or can use partial pixel volumes to estimate intensity. Accurate estimates of probe cell locations in the image can, in turn, allow improved estimates of background contribution to intensity values. See co-pending, co-assigned provisional patent application identified by Ser. No. 60/329,023. Center locations off by even about 0.5 pixels may affect deconvolution of blur and negatively impact the ability to estimate the background.

In certain embodiments, the methods and systems of the present invention provide an alignment process corresponding to a fitting function to iteratively estimate the probe cell locations in an image by (a) obtaining a sample of prospective locations for a given probe cell; (b) assessing each location in the sample according to a predetermined measure of how well pixel intensities fit the prospective location; and (c) translating the estimated probe cell location based on the evaluating step. In certain embodiments, the estimated positions of neighboring probe cells can also be evaluated to assess alignment.

Certain aspects of the present invention include methods for estimating the probe cell locations in a hybridized microarray, comprising the operations of: (a) obtaining an image of the intensity of a microarray having a plurality of individual probe cells; and (b) estimating the center of individual probe cell locations in the image to provide the first estimated locations of the centers of estimated probe cell locations. Then, for respective probe cell locations undergoing analysis, a first fitting region can be generated such that it has a center which coincides with the location of the first estimated center and that has a boundary which can include partial pixel volumes. Pixel intensity data of the first fitting region can be obtained. A second fitting region can be generated such that it has a center which is spaced apart from the center of the first fitting region by less than about one pixel. The second fitting region has a boundary that can include partial pixel volumes. Pixel intensity data of the second fitting region can be obtained. If a fitting function computes the variance of pixel intensity in the fitting regions, then the variance of pixel intensity from the first and second fitting regions can be compared and the likely estimated probe cell location in the image determined based on the comparison. In other embodiments, other characterizing measures of intensity can be used for the comparison.

Other embodiments are also directed at methods for estimating the probe cell locations in an image of a hybridized high-density microarray having a plurality of individual hybridized probe cells thereon. The operations can include: (a) providing a first estimated center location of a respective probe cell location in the image; (b) generating an array of a plurality of potential estimated center locations such that the array includes the first estimated center as one of the estimated center locations; (c) interrogating a plurality of estimated probe cell locations, a respective one probe cell location having a center defined by one of the plurality of potential estimated center locations in the array to obtain pixel intensity data of pixels within the estimated probe cell locations; and (d) comparing the intensity data for each of the interrogated estimated probe cell locations to determine a likely estimated or revised estimated probe cell location.

In certain embodiments, in order to select the location to which to translate the estimated probe cell location, a first or initial center can be defined as a localized regional center, and an array of potential probe cell locations can be spaced about this regional center. The pixel intensities are then evaluated for fit at each location on the array. At each location on the array, weighted penalties can be assigned according to the extent to which the array position is misaligned with its neighbors and the lack of fit of pixel intensities. The weighted penalties can be used to identify which estimated probe cell location is likely to be the most accurate probe cell location (that with the least penalty).

In certain embodiments, fit of a prospective estimate for a probe cell's location in the image is assessed according to the variance of pixel values in a region no larger than a probe cell (and typically smaller than the probe cell in the image) and substantially centered on the prospective probe cell estimated center location of the probe cell defined by a respective point in the array of prospective probe cell center locations. This region can be called the fitting region. When a pixel lies partially inside the fitting region its corresponding partial pixel volume can be added to the total variance of pixel intensity over the fitting region. In certain particular embodiments, the fitting region can be square, the same size for each estimated probe cell location, and the total variance of pixel intensity over the fitting region can be computed. For any given probe cell, a plurality of fitting regions can be generated, a respective one centered at each of the proposed estimates of the center of the probe cell location defined by the array of proposed estimated centers to evaluate the proposed locations for the given probe cell. The plurality of fitting regions generated for a given probe cell can share in common a large number of pixels and have centers that are spaced apart by less than about one pixel.

In addition, the evaluation of a set of proposed estimates for the location of the center of the probe cell undergoing analysis can be performed by: (a) assigning a misalignment penalty for each proposed location according to how severe the proposed location is out of alignment with the estimated centers of proximate or neighboring probe cells, the penalty being greater for greater extent of misalignment; (b) for each proposed location, assigning a fit penalty for lack of fit of pixel intensities within a fitting region centered on the proposed location of the center of the probe cell, the penalty being greater for greater degrees of lack of fit (misfit); and (c) determining which proposed location of the probe cell undergoing analysis has the lesser or lowest penalty to thereby identify the new estimate of the location of center.

The evaluation can include evaluating each pixel within the fitting region of a prospective estimate of a probe cell location for the variance of pixel intensity for both the first and second translated prospective estimated locations.

In certain embodiments, the evaluation may include transforming the intensity data over a (selected) pixel volume or area within an individual probe cell location undergoing analysis. An example of such a transformation is the monotonically increasing logarithmic transformation.

Still other embodiments are directed to systems for estimating probe cell location in an image of a hybridized DNA array. The system comprises a processor and computer program code for estimating probe cell locations in an image of a hybridized microarray comprising, for a respective probe cell location in an image: (a) interrogating a plurality of estimated probe cell locations by generating first and second fitting regions having centers which are spaced apart by less than about one pixel, the first and second fitting regions being able to include partial pixels at their boundaries, (b) analyzing the pixel intensity variance within each of the first and second fitting regions, and (c) selecting the potential estimated location for that probe cell based on the analyzed pixel intensity data.

As will be appreciated by those of skill in the art in light of the present disclosure, embodiments of the present invention may include methods, systems and/or computer program products.

The foregoing and other objects and aspects of the present invention are explained in detail in the specification set forth below.

DESCRIPTION OF EMBODIMENTS OF THE INVENTION

The present invention will now be described more fully hereinafter with reference to the accompanying figures, in which preferred embodiments of the invention are shown. This invention may, however, be embodied in many different forms and should not be construed as limited to the embodiments set forth herein. Like numbers refer to like elements throughout. In the figures, certain regions, components, features or layers may be exaggerated for clarity. The broken lines in the figures indicate that the feature or step so indicated is optional.

The present invention is directed at systems, methods and computer programs for estimating probe cell locations in images (or in digital files thereof) of high-density microarrays or chips for evaluating genetic expression or hybridization (hybridized nucleic acid probes). In a representative embodiment, the files or images reflect fluorescence data from a biological array, but the files may also represent other data such as radioactive intensity data. Examples of microarrays commercially available include the high-density synthetic-oglionucleotide DNA microarray from Affymetrix, Inc., discussed above, and other slides such as spotted arrays by Molecular Dynamics of Sunnyvale, Calif., Incyte Pharmaceuticals of Palo Alto, Calif., Nanogen (NanoChip) of San Diego, Calif., Protogene, of Palo Alto, Calif., Corning, of Acton, Mass. See URL gene-chips.com for information on gene expression companies.

Figure 2:
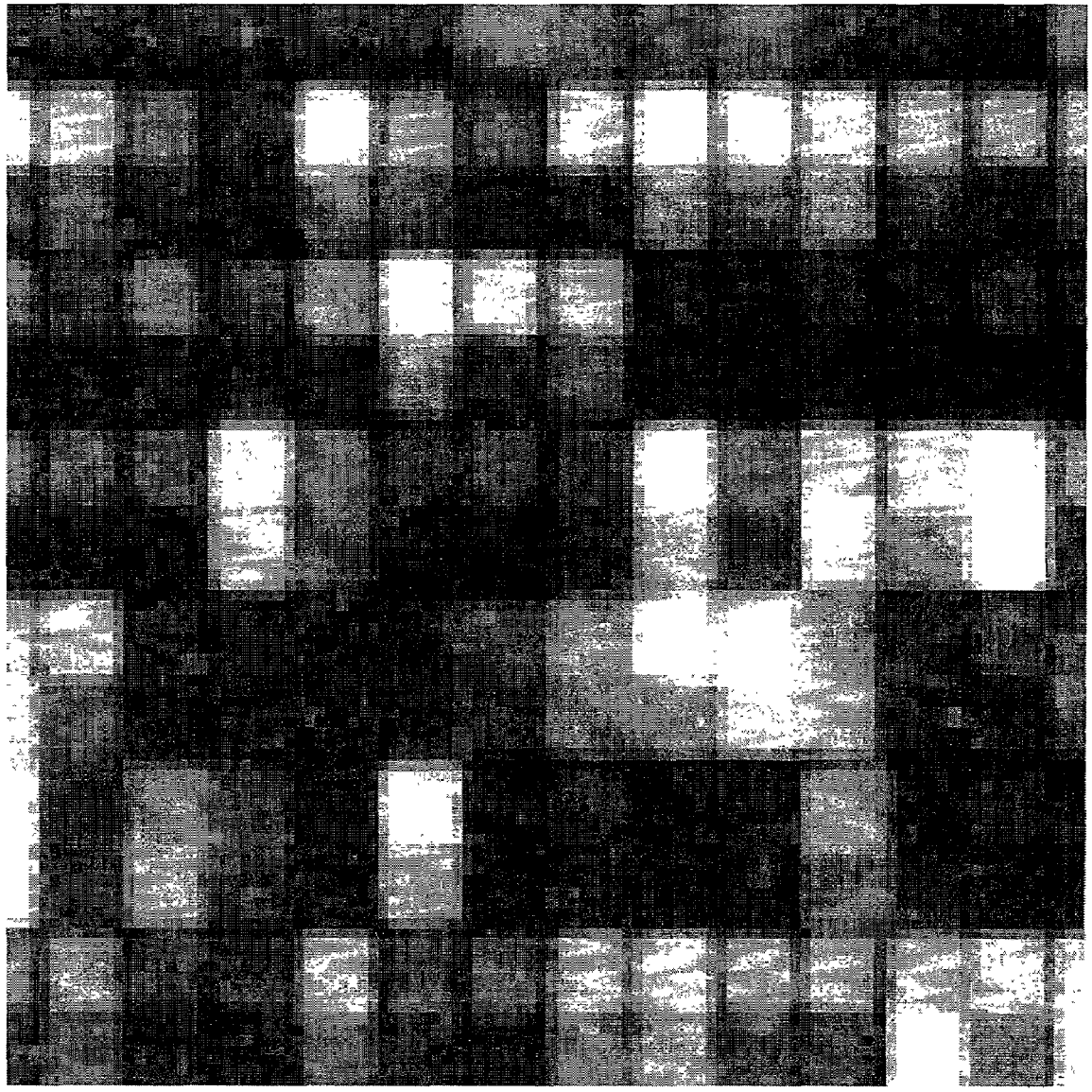
FIG. 2 is a 100×100 pixel region of an image of a log-transformed high-density synthetic-oligonucleotide DNA microarray.
Figure 3:
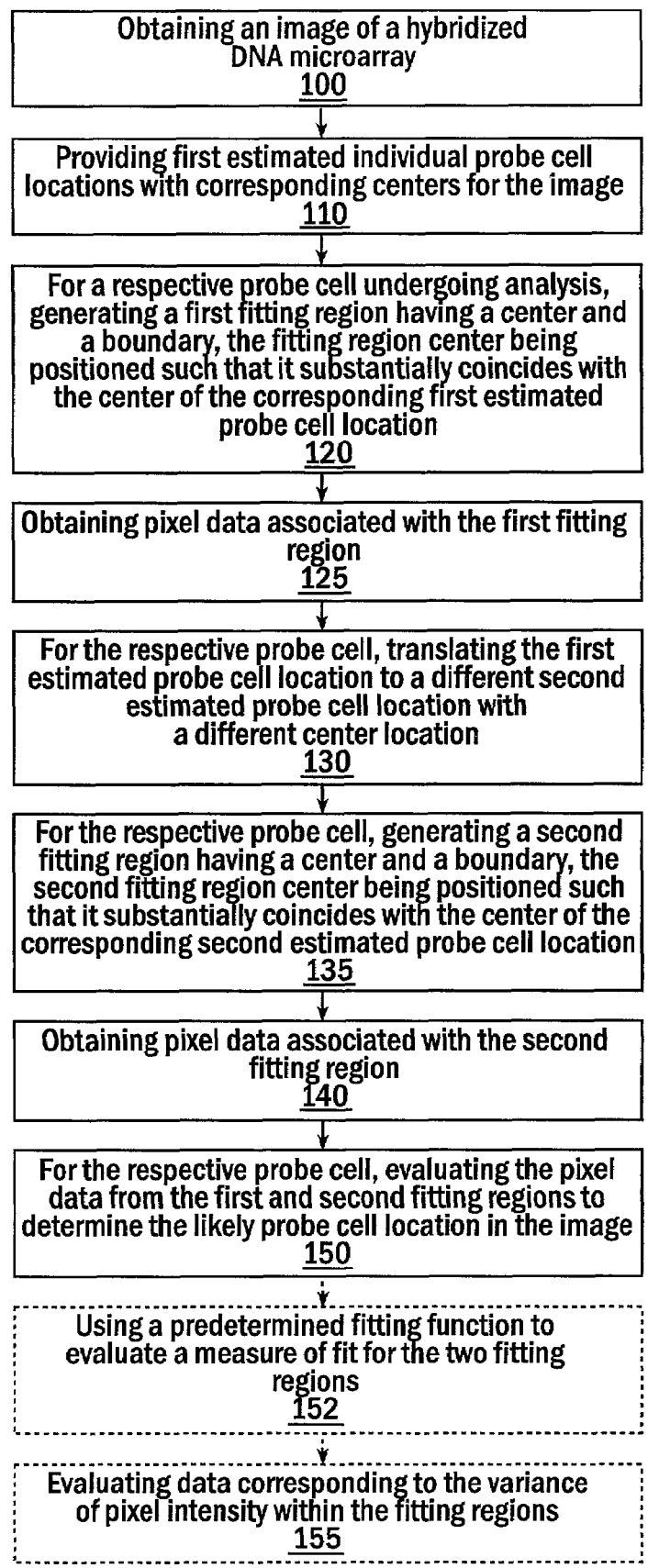
FIG. 3 is a flow chart illustrating operations for estimating probe cell location according to embodiments of the present invention.

Turning now to FIG. 3, operations for estimating probe cell location (or aligning the image to probe cell locations) include obtaining an image of an expressed (DNA) microarray (block 100). The term "expressed" includes hybridized or activated genetic or biomaterial such as, but not limited to, fluorescently labeled nucleic acid probes such as using RNA which binds to DNA probes on a substrate and the like such that the genetic information is imageable. The image is typically a digital image which may be presented in gray scale or color encoded intensity scales. The individual probe cell locations in the image are assigned initial or first estimated locations (block 110). Each probe cell location consists of a center and a boundary enclosing the area of the probe cell about the center. In the HSDM image data shown in FIG. 2, the probe cell areas are approximately 8×8 pixels square. As also shown in FIG. 2, the probe cells are relatively well defined on the physical HSDM but in the HSDM image, their boundaries and centers are unknown, partly because the pixel intensities near the boundaries carry signal from nearby probe cells. Thus, in embodiments of the present invention, the operations of the probe cell location analysis include estimating the location of the center of the probe cell and generating a fitting region which can be centered on the estimated probe cell location. A fitting function or measure of fit can compute how well the fitting region fits or corresponds to the estimated probe cell location. An example of a suitable fitting function is a function that evaluates the variance of pixel data within the fitting region associated with the estimated probe cell as will be discussed further below.

Referring again to FIG. 3, a first fitting region having a center and boundary is generated and centered on the first estimated probe cell location (block 120). Pixel data associated with the first fitting region is obtained (block 125). The pixel data may include partial pixel volumes for pixels about the boundary of the fitting region. For a respective probe cell, the first estimated probe cell location is translated to a different second estimated probe cell location with a different center (block 130). A second fitting region having a center and boundary is generated and substantially centered on the second estimated probe cell location (block 135). Pixel data associated with the second fitting region is obtained (block 140). The pixel data from the first and second fitting regions is evaluated (compared) to determine the likely estimated probe cell location in the image (block 150).

In certain embodiments, a predetermined fitting function can be used to evaluate a measure of fit for pixel data within selected fitting regions of the probe cell undergoing analysis (to identify the one(s) with the best fit) (block 152). Stated differently, the fitting function can evaluate or assess the degree of fit for each of the selected fitting regions and their corresponding probe cell centers and locations of respective estimated probe cell locations. The fitting function can compute and evaluate variance of the pixel data within the fitting region(s) (block 155) and/or the degree of misalignment of the center of the fitting region with the neighboring probe cells, or other suitable parameters. The estimated probe cell location for a respective probe cell can be translated multiple times during the estimating process and at each translation, the associated fitting region can be used to assess the fit of the pixel data within.

The probe cell location typically has a number of pixels (such as 6×6, 8×8 and the like), and a center associated therewith along with a corresponding boundary about the perimeter thereof. The perimeter of the probe cell does not lie on pixel boundaries and may intersect pixels. In a series of genechips known by those in the art as "U95", the probe cells average about 6.67×6.67 pixels in size. The fitting region may be generated so that it is sized to cover substantially all of the (physical) size of the individual probe cell or may be configured as a smaller subset of the individual probe cell. The fitting region may be the same for or different from other probe cell locations in the image undergoing analysis.

Figure 4A:
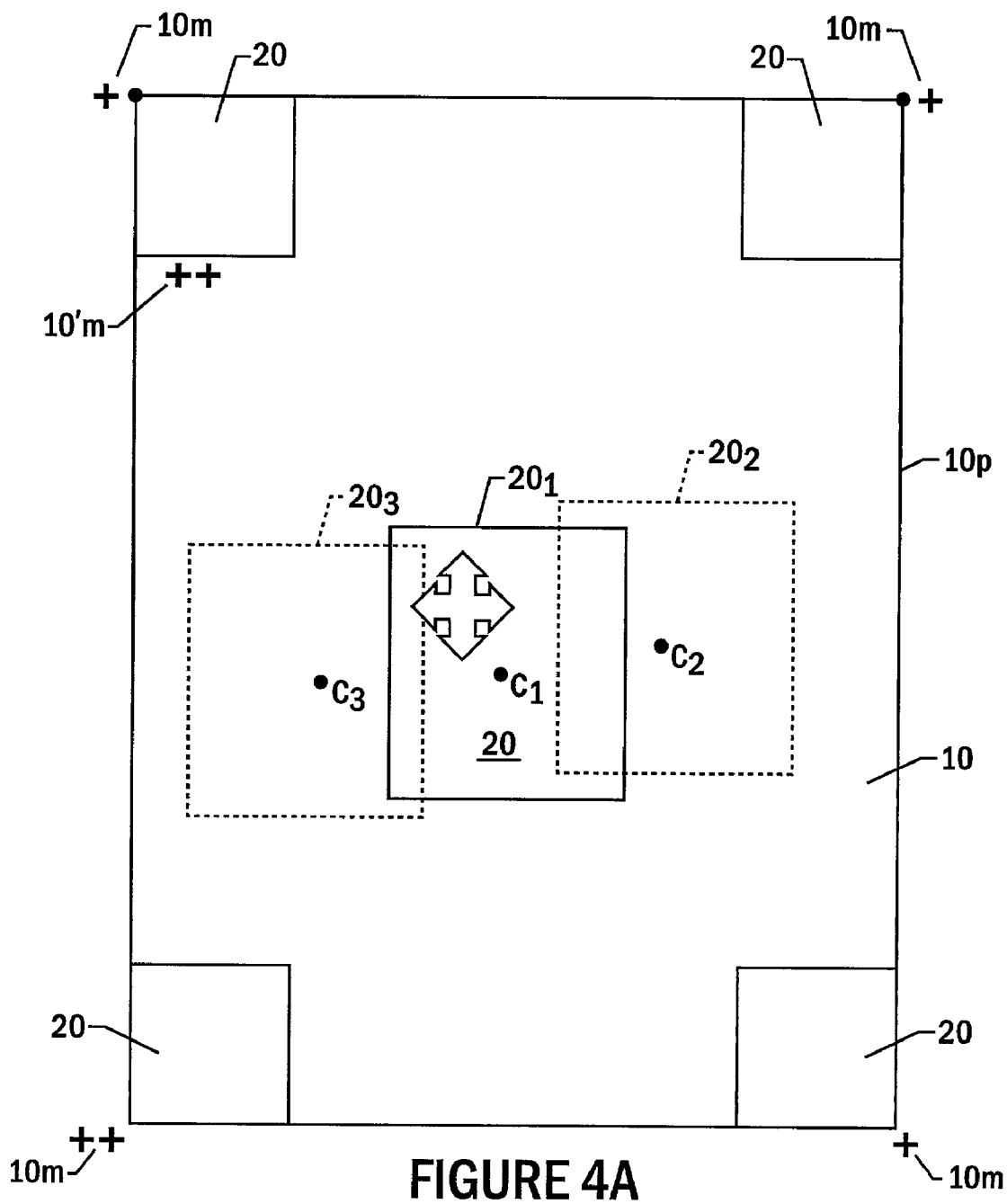
FIG. 4A is a schematic illustration of an iterative process for estimating probe cell location according to embodiments of the present invention.

FIG. 4A illustrates the operations described in FIG. 3. An array 10 of estimated prospective probe cell centers (of the estimated probe cell locations) can be generated. Typically, the array 10 will conform in shape to the layout of probe cells in the image. In the case of the image shown in FIG. 1, which has an array of 534×534 probe cells, the array 10 would be square with 534×534 entries. Each entry in array 10 can contain two elements, one for vertical alignment and one for horizontal alignment. Visually or optically readable alignment marks 10$m$ one in each of the four corners of the image can be used to establish the locations of the corresponding corner entries in the array 10. The remaining entries in the array 10 can be computed by linear interpolation between the corners. Other indicators of alignment 10'$m$ can be located at other desired positions (such as centrally or internal of the four corners) may be included in the chip or other image recognition marks can be used for identifying an initial alignment position. The array 10 can then specify the initial estimated center locations, one for each probe cell 20 in the image.

In FIG. 4A, the probe cell locations 20 are illustrated for clarity as a few spaced apart probe cell location arrays. As noted above, many DNA microarrays are high-density chips having 4000×4000 or even larger pixels in a miniaturized chip (typically in a 0.5 inch×0.5 inch (1.28×1.28 cm) or smaller physical chip configuration, the image of which may be enlarged during evaluation).

In overview, as shown by the probe cell at the center of FIG. 4A, where a particular probe cell 20 location (illustrated as a probe cell location in the center of the figure), a prospective center location $C_1$ and corresponding fitting region $20_1$ are established. The true or actual location of the probe cell (not shown) is unknown. In order to estimate the an estimate of the true location of the probe cell in the image, a sample of prospective probe cell centers $C_2$, $C_3$ within corresponding fitting regions $20_2$, $20_3$ are evaluated by computing a measure of intensity (such as the intensity variance) and comparing those measures of intensity to assess the likely "true" location of the probe cell.

An initial estimate of the location of the center of the probe cell under analysis can be obtained from prior information, such as in an array of center locations, one center for each probe cell. The prior information can include, inter alia, one or more of: (1) alignment patterns formed or placed in the corners or other locations of the HSDM microarray of probe cells; (2) a previous estimated location of the center of the probe cell under analysis; (3) estimated locations of centers of neighboring probe cells; (4) the size, shape or spacing of the probe cells on the microarray; and (5) a calculated centroid based on the estimated centers of neighboring probe cell locations. This estimate of the location of the center of the probe cell can be termed the initial estimated center, the estimated center can be translated and that translated location can be used to define the next prospective (then "current") estimated center location.

Figure 4B:
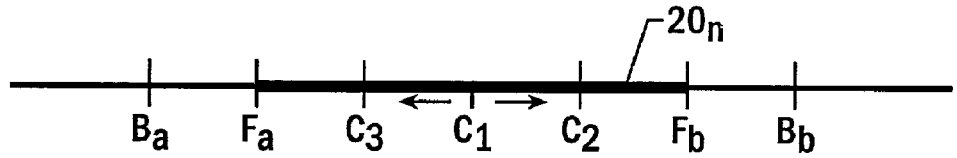
FIG. 4B is a schematic illustration of a fitting region according to embodiments of the invention.
Figure 4C:
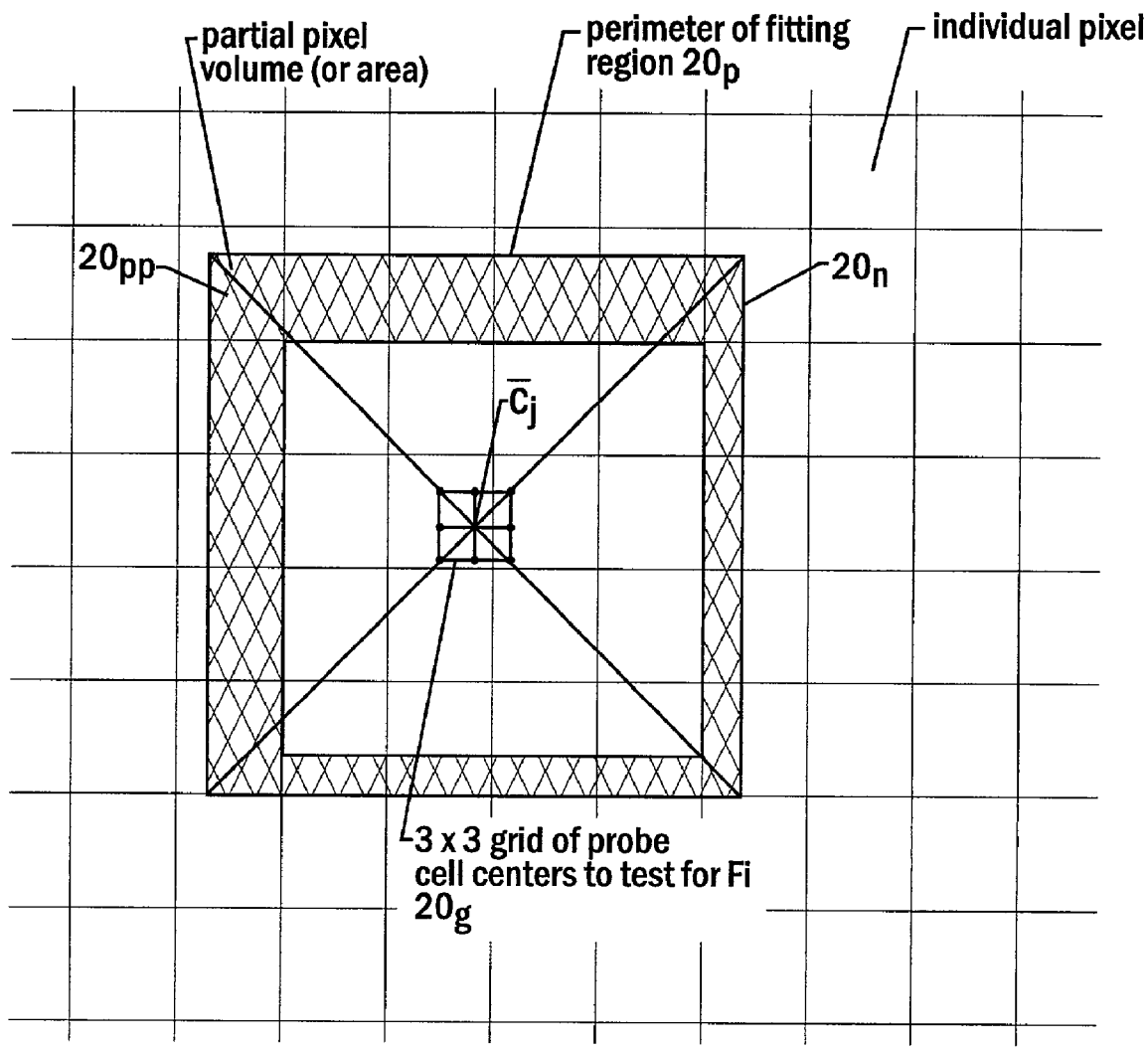
FIG. 4C is a schematic illustration of a fitting region according to alternate embodiments of the invention.

As shown in FIG. 4C, the fitting region 20$n$ with a boundary or perimeter 20$p$ is generated. As shown, the fitting region 20$n$ is two-dimensional and can be arranged in the image such that it includes partial pixels 20$pp$ about its perimeter 20$p$. Pixel intensities within the fitting region corresponding to the current estimated center are evaluated. A fitting function can be used to evaluate the pixel intensities within the fitting region 20$n$. The fitting function can be used to evaluate or consider the measure of fit across the fitting region so as to assess whether the estimated location is good. The current estimated center can be in a continuous coordinate system and the size, shape or position, of the fitting region 20n can vary as desired. That is, for substantially rectangular probe cells, the fitting region 20n can be rectangular or non-rectangular and can be drawn so that it includes partial pixel volumes 20pp (pixels dissected by the boundary line of the fitting region). To analyze the degree of fit, the intensities of the pixels and the partial pixels can be considered. That is, fit can be based, in part, by including partial pixel volumes.

Pixel Volume=Pixel Area×pixel intensity     Equation (1)

and

Partial Pixel Volume=proportion of the partial pixel area within the boundary×pixel intensity     Equation (2)

The sample of prospective alternative locations of probe cell centers are locations which are near or adjacent the initial or present estimated position. The locations of the alternative estimated centers might be different from the initial estimated position or each other by less than one pixel (less than one pixel length and/or width). Of course, other translations may be implemented such as translations greater than one pixel such as above about 1–1.5 pixels or even more.

The evaluation of fit from each fitting region contributes to determining which prospective estimated center location, including the initial or present estimated center location, will become the revised estimated center location. The fitting region can be configured with a size and shape so that it covers a portion (major, or minor), or all, of the probe cell at the first estimated location.

Thus, the fitting regions can differ by small translations and a majority of their areas overlap. In FIG. 4A, $C_2$ and $C_3$ are alternative estimated center locations for the probe cell under analysis taken from the sample of prospective alternative center locations local or proximate the current estimate at $C_1$.

FIG. 4B illustrates a linear (one-dimensional) fitting region 20n with $F_a$, $F_b$ representing the bounds of the fitting region 20n and $B_a$, $B_b$, the unknown bounds of the probe cell. $C_1$ is the center of the fitting region 20n. $C_2$ and $C_3$ are the centers of prospective translated fitting regions. The width of $F_a$ to $F_b$ can depend on the fitting function used. The translations $C_1$ to $C_2$, $C_1$ to $C_3$, ..., may depend on the shape of the fitting region 20n used to sample the pixel data in the estimated locations. The initial selection of $C_1$ can be the centroid of neighboring estimated probe cell locations.

In operation, the alignment array 10 is arranged to align with the estimated locations of probe cells. For each probe cell, the method can incrementally translate (as shown by the dotted line positions and the arrows) about prospective estimated probe cell locations, within a limited localized region, from a first to a second translated location, and then, as desired to a third, and so on, by translating the estimated center location (and thus, the corresponding fitting region center). Each of these estimated positions includes a different center location, $C_1$, $C_2$, and $C_3$, respectively and a substantial number of the same pixels can be shared in common in each of the positions.

In certain embodiments, because, conventionally, probe cells are laid out in a rectangular array, a first step in estimating probe cell locations can be to identify the coordinates (such as the x, y axis position or the row, column position) of the probe cells located at the four corners of the array. Once the corner locations are established, locations of the remaining probe cells can be estimated by linear interpolation. Other probe cell locations or alignment indicia can be used to establish the initial probe cell(s) estimation position(s).

Probe cells may not be equally spaced and linear interpolation can be inaccurate (believed to be misaligned by as many as three pixels in both the vertical and horizontal directions). In experiments performed related to this invention, deviations from an interpolated lattice were gradual, and can be modeled as a continuous deformation of the HSDM. To accommodate this deformation, interpolated locations of predicted probe cell positions can be used as initial estimates of probe cell locations. Thereafter, an iterative algorithm gradually translates the estimated locations of individual probe cells in a manner which can maintain relatively strong local lattice relationships among neighboring probe cells.

Figure 10:
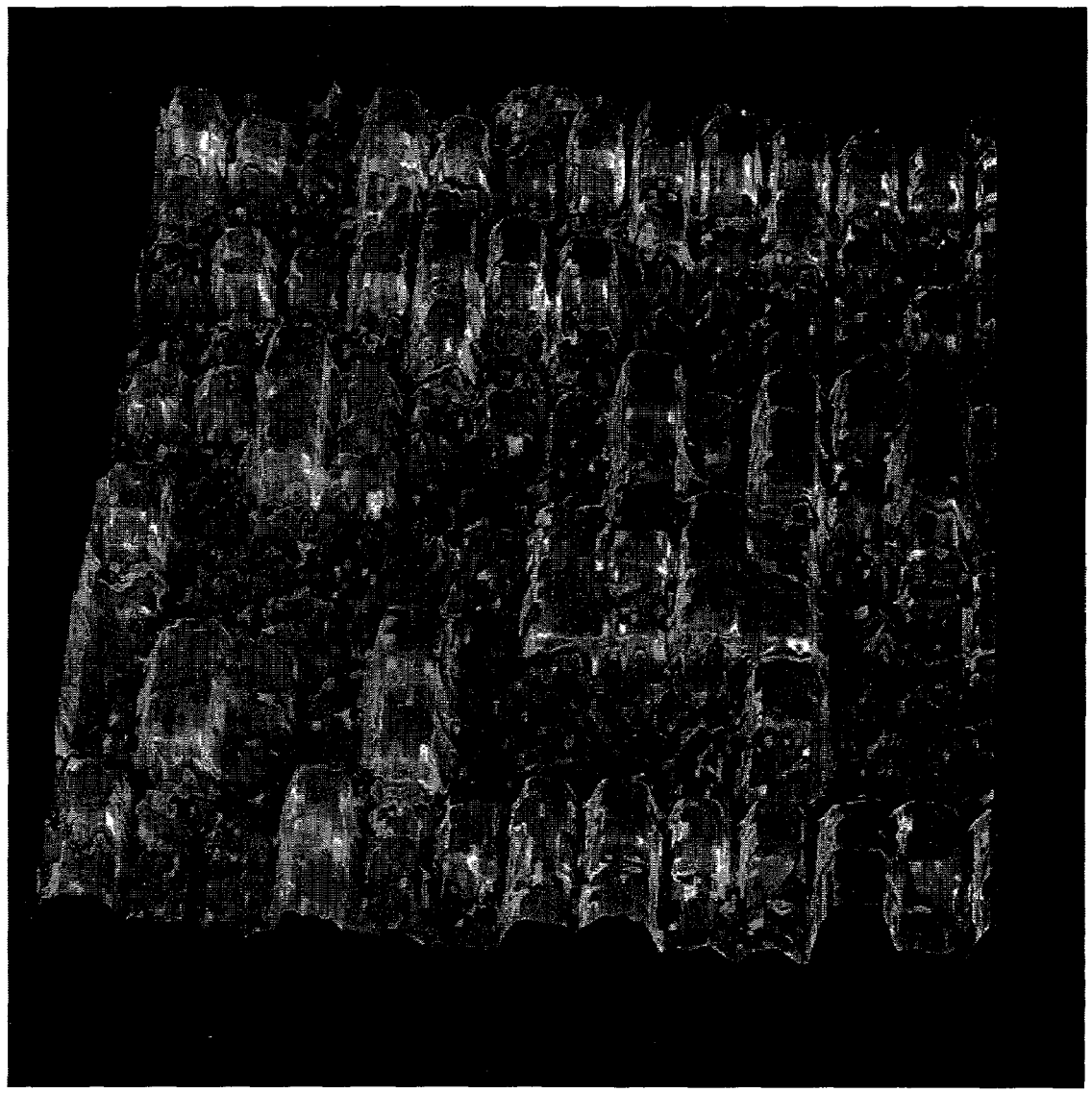
FIG. 10 is a three-dimensional representation of a 100×100 pixel region of an image of a log-transformed high-density synthetic-oligonucleotide DNA microarray.

When evaluating probe cell locations, the present invention can analyze pixel intensities within the fitting regions 20n to assess how well the fitting region is aligned with a corresponding probe cell location. In certain embodiments, this assessment is made in terms of comparing pixel data associated with alternative fitting regions translated locally such that each translation shares a majority of their regions in common with the previous estimated location. Referring to FIGS. 2 and 10, it can be seen that regions near the center of probe cell locations tend to have similar pixel intensities with abrupt changes in pixel intensities occurring near the edges of some or many of the probe cell locations.

In certain embodiments, as discussed briefly above, the fitting region 20n can be sized so that it is smaller than the size of the probe cell in the image such that if the estimated center of the location of the probe cell is sufficiently accurate, the fitting region 20n will exclude perimeter pixels (or partial pixels) with abrupt changes in intensities. Thus, in certain embodiments, the variance of pixel intensities in the fitting region is used as the fitting function. In this embodiment, estimated locations of the center of a probe cell under analysis are compared using the variance of pixel intensities in the corresponding fitting regions and smaller variances indicate better fit.

In other embodiments, the fitting region 20n, can be sized to be large enough to cover the entire probe cell location in the image and the fitting function can be modified to detect the boundaries of probe cells.

Figure 5:
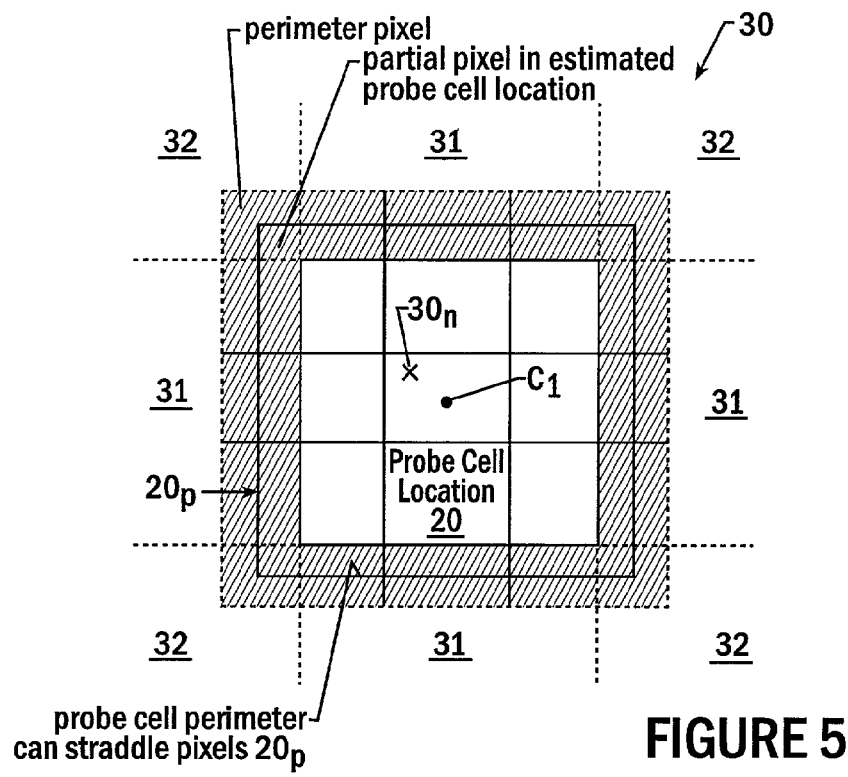
FIG. 5 is a greatly enlarged schematic illustration of a probe cell neighborhood according to embodiments of the present invention.

FIG. 5 illustrates a probe cell neighborhood 30 where a plurality of closely spaced adjacent probe cell locations in the image (each having an array of pixels associated therewith) are located. As shown, there are four primary neighbors 31 sharing a perimeter side and four secondary neighbors 32. The probe cell location 20 includes a perimeter 20p that can cross the interior regions of pixels. That is, as shown pixels can straddle adjacent probe cells.

Figure 6A:
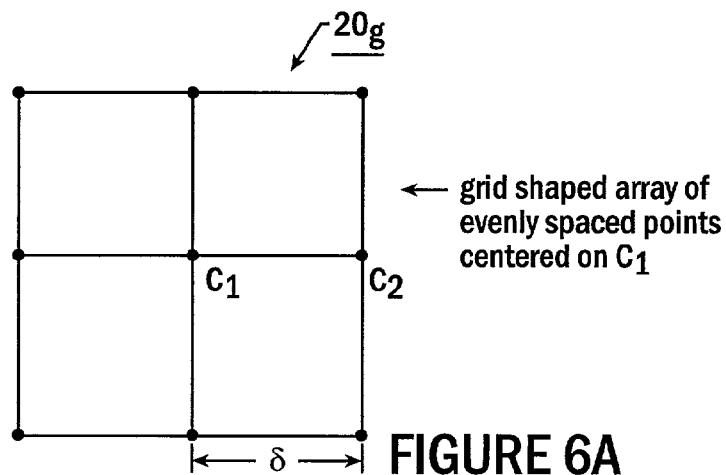
FIG. 6A is a greatly enlarged schematic view of a grid or array that can be used to assess prospective estimates of the location of the center of a probe cell according to embodiments of the present invention.

In certain embodiments, the initial estimated location of a respective probe cell location under analysis can be established by averaging the estimated locations of centers of probe cells in its neighborhood 31 (FIG. 5). As shown in FIG. 6A, a potential center location array or grid 20g of surrounding locations centered on the current estimated location (shown as $C_1$) can then be used to sample prospective alternative locations which may be suitable to be identified as a potential revised estimated center location of the probe cell location under analysis. Thus, the potential center location array or grid 20g, located relative to the current estimated center, can be used as a roadmap to locally transform or deform the centers of the corresponding fitting regions relative thereto.

Stated differently, probe cell locations or centers thereof near the probe cell location in the image currently under analysis may provide prior information in regard to where the true center of the probe cell location is likely to be. The centers of the estimated probe cell locations of proximate probe cells can be averaged to define a neighborhood centroid (shown as $\bar{C}j$ in FIG. 4C) or center about which prospective locations for the probe cell location under analysis can be sampled for fit. An array or grid of coordinates $20g$ symmetrically spaced about this center can provide a plurality of prospective estimated probe cell centers and corresponding fitting regions.

In certain embodiments, the current prospective estimated center location (or search center) can be established by using the estimated centers of the eight probe cell locations adjacent and surrounding the probe cell location under analysis (primary and secondary neighbors 31, 32) in the neighborhood 30 (FIG. 5). Alternatively, only the primary neighbors 31, only the secondary neighbors 32, or selected combinations of the two types can be used. In other embodiments, probe cell locations beyond the immediate neighbors can be included. In certain embodiments, a symmetrically opposing set of proximate or adjacent neighbors (located across the probe cell location of interest) can be used to locate the search center. Adjustments can be implemented at edges or corners of the probe cell locations where symmetry may be disrupted.

Figure 6B:
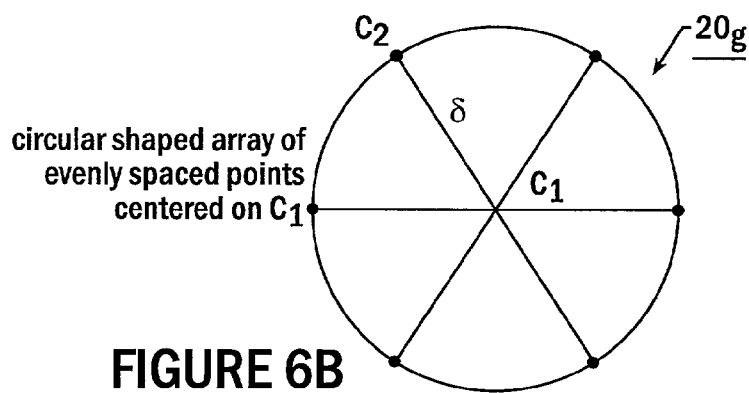
FIG. 6B is a greatly enlarged schematic view of an alternative grid or array that can be used to assess prospective estimates of the location of the center of a probe cell according to embodiments of the present invention.

In certain embodiments, as shown in FIG. 6A, the potential center location array or grid $20g$ includes a plurality of points (shown as 9 including $C_1$) which are evenly spaced about a square shape having $C_1$ as its center. FIG. 6B illustrates the grid $20g$ having a plurality of points (shown as 7 including $C_1$) shaped as a circle having $C_1$ as its center, and the potential or prospective center estimates for interrogation (defining the translated fitting regions) being spaced about the circumference of a circle. In certain embodiments, the neighborhood center $31c$ of the eight probe cell locations surrounding the probe cell location under analysis can form the initial center estimate $C_1$ and is used as the center of the sampling grid $20g$. In alternate embodiments, the neighborhood center $31c$ (FIG. 5) may be located at a position that is not the center of the grid $20g$. Thus, the center $C_1$ can be identified as a prospective location of the estimated center of the respective probe cell location under analysis. Similarly, $C_2$ is a prospective location of the respective probe cell location and its center is translated a distance (shown as $\delta$) from that of the estimated center $C_1$.

In operation, a plurality of prospective locations for the estimated center of the probe cell under analysis are evaluated by aligning a plurality of fitting regions $20_n$ ($20_1$–$20_n$) such that each fitting region has a center corresponding to one of the proposed estimated centers in the grid $20g$. Pixel intensity data an be obtained for each of the fitting regions. The fit of pixel intensity data to the prospective location can be evaluated by assessing the intensity data associated with each of the fitting regions. The evaluation can be carried out or the intensity measured using a fitting function.

In particular embodiments, the fit of each fitting region corresponding to the prospective estimated center locations associated with the grid $20g$ can be evaluated based on a comparison of the variation of the intensity of the pixel values between each of the interrogated or sampled fitting regions. The spatial translation (shown as $\delta$) of the estimated center location ($C_1$–$C_2$ . . . ) can be less than the size of an individual pixel such that each of the fitting regions at each location share a common area. All of the estimated centers of the probe cell location defined by the grid points can be sampled or selected ones can be sampled. At each sampled location, the intensity variation or other measure of fit can be evaluated. The location having a reduced variation in intensity, relative to the other sampled estimated locations, can be identified as a likely or potential next or "ultimate" estimated probe cell location.

Figure 7:
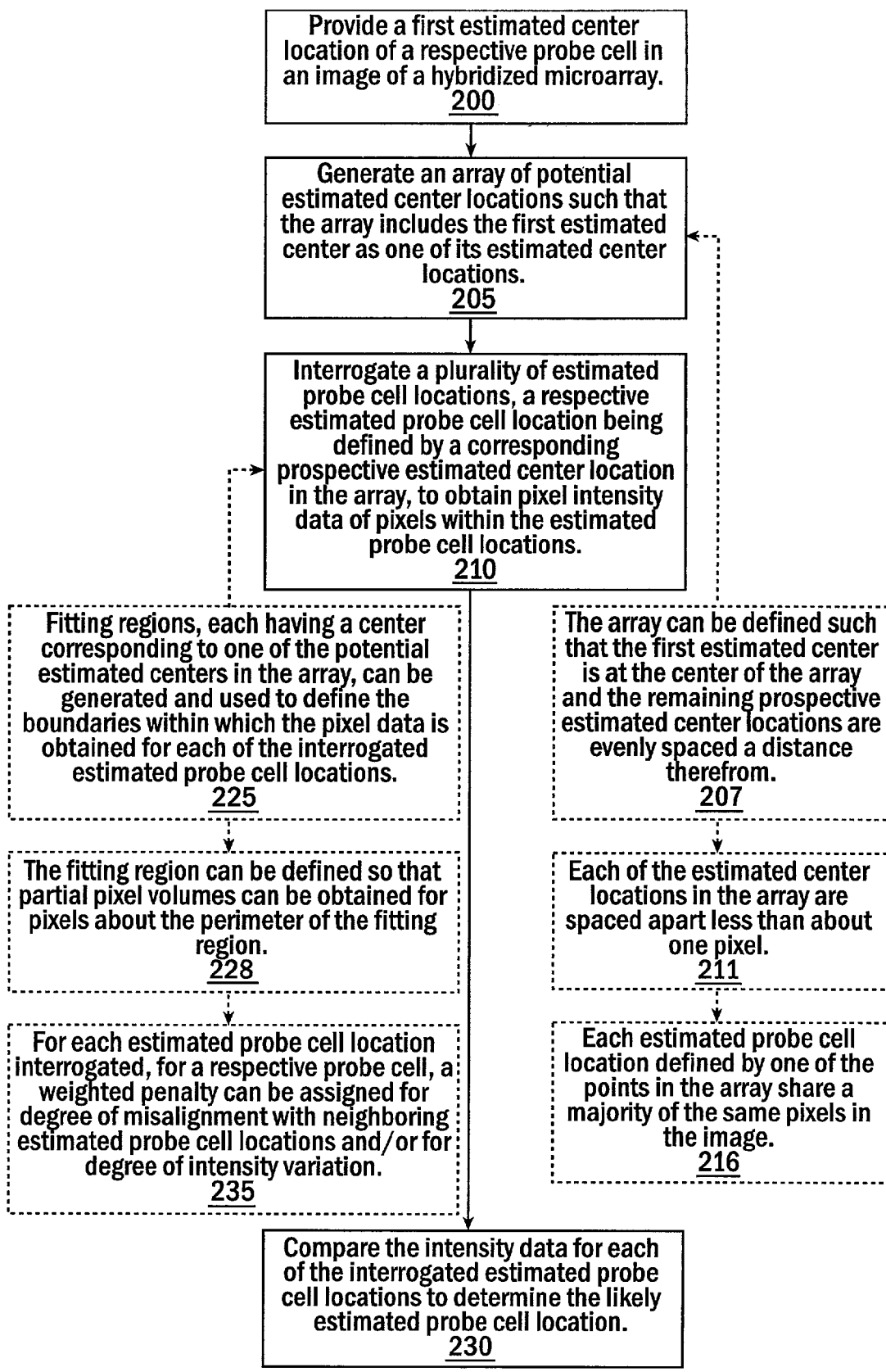
FIG. 7 is a flow chart illustrating operations for estimating probe cell location according to embodiments of the present invention.

FIG. 7 illustrates operations according to further embodiments of the present invention. As shown, a first estimated center for a probe cell location in an image of a hybridized microarray is provided (block 200). The first estimated center may, in certain embodiments, be the centroid of neighboring estimated probe cell locations. An array having a plurality of points corresponding to potential prospective estimated center locations is generated with the first estimated center being included as one of the estimated center locations (block 205). A plurality of estimated probe cell locations are interrogated, a respective estimated probe cell location being defined by one of the estimated center points in the array, to obtain pixel intensity data of pixels within the estimated probe locations (block 210). The intensity data for each of the interrogated estimated probe cell locations can be compared to determine the best or likely estimated probe cell location (block 230). These operations can be repeated to sample or interrogate additional proximate regions in the image to revise the estimated location of the probe cell.

As shown, in certain embodiments, the array can be defined such that the first estimated center is at the center of the array and remaining prospective estimated center locations are evenly spaced a distance therefrom (block 207). Subsequent iterations can use the revised center estimated location as the center of the array. Each of the estimated center locations in the array can be spaced apart less than about one pixel (such as 0.10–1.0 pixels) (block 211). Each of the estimated probe cell locations defined by one of the center points in the array share a majority of the same pixels in the image (block 216).

In certain embodiments, fitting regions can be generated, each having a center corresponding to one of the estimated center points on the array. The fitting regions can be used to define the boundaries within which the pixel data is obtained for each of the interrogated estimated probe cell locations (to identify how much of the estimated probe cell location is sampled or interrogated) (block 225). Stated differently, a first fitting region having a center corresponding to one of the potential prospective estimated center locations is generated and pixel intensity data is obtained. Then, a second fitting region corresponding to a different one of the potential prospective center locations is generated and the associated pixel intensity data obtained. These operations can be repeated until each of the prospective estimated centers in the array is sampled. The fitting region can be defined so that it covers a subset of the estimated probe cell location and can include partial pixel volumes at its boundary or perimeter (block 228). For each estimated probe cell location interrogated (for a respective probe cell in the image), a weighted penalty can be assigned for degree of misalignment with neighboring estimated probe cell locations and/or increasing degree of intensity variation (block 235).

Thus, the comparison can be based on intensity variance of pixels at each of the sampled fitting regions. A penalty can be assigned to those fitting region locations having high variation. Other measures of fit can also be used such as the mean absolute deviation of pixel values, or other suitable summaries representative of the fit of pixel intensity within each sampled fitting region to evaluate proposed center locations of estimated probe cell locations. As will be discussed further below, in certain embodiments the logarithm of pixel values can be calculated and used to assess relative variance. In addition, the degree of offset relative to estimated centers of proximate probe cell locations may be considered and penalties for degree of deformation from its predictive location may be used to rank the estimated center location.

Each time a new estimated center location is established, such as moving the initial estimated center from $C_1$ to $C_2$ if $C_2$ is identified as having a lower variance, an additional potential estimated center array can be generated (at each probe cell location in the image undergoing analysis) and aligned with the new estimated center. As noted above, the array of prospective estimated center locations can be aligned such that its center is aligned with the current estimated center location. In other embodiments, the array may be offset but include the current estimated center as a potential estimated center location (it may be the best estimated center location). In this way, the estimated center location can translate locally a number of times from a location associated with an initial estimated center location to a different location.

The variance and/or penalties for each of the estimated probe cell locations corresponding to a particular probe cell on the chip can be compared and ranked, and the "ultimate" or most likely estimated probe cell location in the image can be identified as that location having the lowest penalty weight. Alternatively, in lieu of using penalties assigned to locations with the highest variance or undesired features, a bonus can be assigned to the location having the lowest variance or the least unfavorable or undesirable image features for a particular location.

In certain embodiments, the fitting regions may be sized to substantially cover the size of the probe cell location in the image. In this embodiment, the boundary of the probe cell location may be estimated. In addition, pixel intensities of pixels located in the perimeter region or periphery of neighboring probe cells can be interrogated or analyzed. The proper bounds of the estimated probe cell location may be able to be assessed by detecting whether there are abrupt changes in pixel intensities in proximate pixels in neighboring probe cell locations. "Abrupt" means a substantial difference in pixel intensity values between the sampled pixels such as at least about a 25% difference. Often, pixels intensities vary by an order of magnitude. This information or data may be considered in assessing whether the proper bounds of the probe cell have been identified (or whether the probe cell boundary may include one or more pixels which are presently identified as located in neighboring estimated probe cell locations).

To help drive the deformation to include those estimated probe cell locations with strong boundary indications: (a) the logarithm of pixel values can be used; and/or (b) a weighted alignment penalty can be assigned to the estimated cell location(s) which are misaligned from its neighbors (as will be discussed further below). Each of these parameters can be considered in deriving the "ultimate" estimated probe cell location.

Generally stated, the alignment algorithm of embodiments of the present invention may be configured to operate by modifying a "facet model" described in Laading, et al., *A hierarchical feature based deformation model applied to 4D cardiac SPECT data*, Lecture Notes in Computer Science: Information Processing in Medical Imaging, pages 266–279 (Springer-Verlag: Berlin 1999).

When searching for a revised location for the estimated center of a probe cell, a penalty can be assigned for locating an estimated probe cell location out of alignment with estimated center locations of its neighbors. An additional penalty can be used to account for the lack of fit (such as for the degree of variance of pixel intensities) in the fitting region at each estimated location sampled via the estimated center locations defined by the array of proposed prospective estimated centers. The penalties can be combined into a single summary penalty. Thus, for a given or respective probe cell location, locations near its current (estimated) location are sampled and the sampled location with the smallest penalty is chosen as the revised location.

The probe cells shown in FIG. 2 and the three-dimensional representation of hybridization in FIG. 10 illustrate that the probe cell boundaries may be evident by abrupt changes in pixel-to-pixel intensities in near neighboring probe cells. In both figures, the lattice structure showing how the probe cells are laid out in a rectangular array of square regions is evident. In both figures, the data has been log transformed and the probe cell locations in the image are approximately 8×8 pixels in size. For a given probe cell, a fitting region comprising 6×6 pixels or smaller can be used together with computed variance as the fitting function to assess the alignment of a set of prospective estimated locations for the probe cell center. Large variance relative to the set of computed variances indicates lack of fit and prospective estimated locations with large variances receive large penalties for lack of fit. Prospective locations that are most out of alignment with neighboring probe cells would receive the largest penalty for deviating from the lattice structure. Thus, in certain embodiments, the present invention can consider both the local lattice structure of the gradually deformed HSDM and the increased variance due to the misalignment of the fitting region to derive a penalty that summarizes each sampled location for the estimated probe cell center.

To revise the estimated probe cell location, the estimated center of a probe cell location can be revised by the following procedure. Let j be a variable that indexes the array of probe cells and let $c_j$ be the current estimate of the coordinates of the center of probe cell j. Even though pixels are discrete, the elements of $c_j$ can be considered to be continuous. Let $N_j$ be the set of indices of the eight neighbors of probe cell j and let $\overline{c_j}$ be the centroid of $\{c_k\}_{k \in N_j}$. Based on the criterion of retaining local lattice structure, the optimal revised estimate of $c_j$ can be $\overline{c_j}$ and, in certain embodiments, the present invention uses $\overline{c_j}$ as the center of a 3×3 rectangular grid of evenly spaced locations (potential center locations of the estimated probe cell location) which can be revised estimates of $c_j$. These nine locations can be called $\alpha_{uv}$, with u, v∈[−1, 0, 1], $a_{00}=\overline{c_j}$ and let δ∈(0, 1] be the distance separating adjacent locations. At each $\alpha_{uv}$ the penalty for locating the probe cell out of alignment with its neighbors can be expressed as $t_{uv}= \sqrt{u^2+v^2}$. Corresponding penalties for variance of pixel intensities can then be computed by superimposing a 6×6 array of pixels at each $\alpha_{uv}$. The pixel intensities of the superimposed arrays can be calculated by averaging over partial pixel volumes of the log transformed data and the variance, $s_{uv}^2$, of the 36 composite pixels can be calculated for each $\alpha_{uv}$. The decision of which $\alpha_{uv}$ to choose as the revised estimate of $c_j$ is based on minimizing a weighted average of the penalties $t_{uv}$ and $s_{uv}^2$. An effective weighted average can be $\delta t_{uv}+5s_{uv}^2/s^2$, where $s^2$ is the mean of $s_{00}^2$ over all probe cells.

Prior to the first iteration of the operations, the four corners of the probe cell array can be assigned coordinates by visual inspection. The locations of the centers of all the probe cells in the array can then be estimated by linear interpolation between the four corners, $s^2$ can be computed and $\delta$ can be initialized to a value such as 0.5 pixels. This initialization can be called the completion of iteration 0. For each subsequent iteration, the probe cell locations, $c_j$, j=1, ..., $N_1 \times N_2$ are updated sequentially where $N_1$ and $N_2$ are the number of rows and columns in the array of probe cells (such as 534×534). In each case, the revised $c_j$ can immediately replace the estimate from the previous iteration as can the contribution of $s_{00}^2$ to $s^2$. Thus, each computation of location $c_j$ can be based on the most recently revised members in the set of all $c_k$ in neighborhood j, $\{c_k\}_{k \in N_j}$. After each iteration, $\delta$ can be decremented by a small amount such as about 0.05 and the iterations can cease when $\delta$ is no longer greater than 0.

In operation, not all probe cells in the image may provide the same amount of information regarding their locations. Many probe cells record little or no RNA hybridization, and hence, little or no information about their boundaries. In these cases it is anticipated that any $s_{uv}^2$ would constitute a similar penalty for all combinations of u and v and the revised $c_j$ would tend to be $\overline{c_j}$. The effect of such operations is to weight the penalties so that in early iterations, probe cells carrying the most information about their boundaries drive the deformation of the grid. The restricted search range in latter iterations reinforces the smoothness of the deformation. In addition, by using the logarithm of pixel values, probe cells carrying information about their boundaries may be encouraged to drive the deformation uniformly. In place of the log transformation, other transformations such as the square root or the cube root transformation can be used to re-weight how probe cells drive the deformation.

Once the best or likely estimated probe cell locations are identified, the intensities associated with the respective probe cells can be estimated. For example, FIGS. 11–15 are graphs that illustrate estimated probe cell intensities. These graphs were generated using the average of pixel intensities over the same fitting region corresponding to the estimated center location identified as having the least penalty. Smaller or larger regions about the fitting region within the estimated probe cell location can be used to estimate the probe cell intensity. Thus, the pixels used to evaluate fit may also be used to estimate probe cell intensities. In other embodiments, greater or lesser numbers of pixels (or partial pixel volumes) may be used to establish the estimated probe cell intensities.

As will be appreciated by one of skill in the art, the present invention may be embodied as a method, data or signal processing system, or computer program product. Accordingly, the present invention may take the form of an entirely hardware embodiment, an entirely software embodiment or an embodiment combining software and hardware aspects. Furthermore, the present invention may take the form of a computer program product on a computer-usable storage medium having computer-usable program code means embodied in the medium. Any suitable computer readable medium may be utilized including hard disks, CD-ROMs, optical storage devices, or magnetic storage devices.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted or otherwise processed in a suitable manner if necessary, and then stored in a computer memory.

Computer program code for carrying out operations of the present invention may be written in an object oriented programming language such as Java®, Smalltalk, Python, or C++. However, the computer program code for carrying out operations of the present invention may also be written in conventional procedural programming languages, such as the "C" programming language or even assembly language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Figure 16:
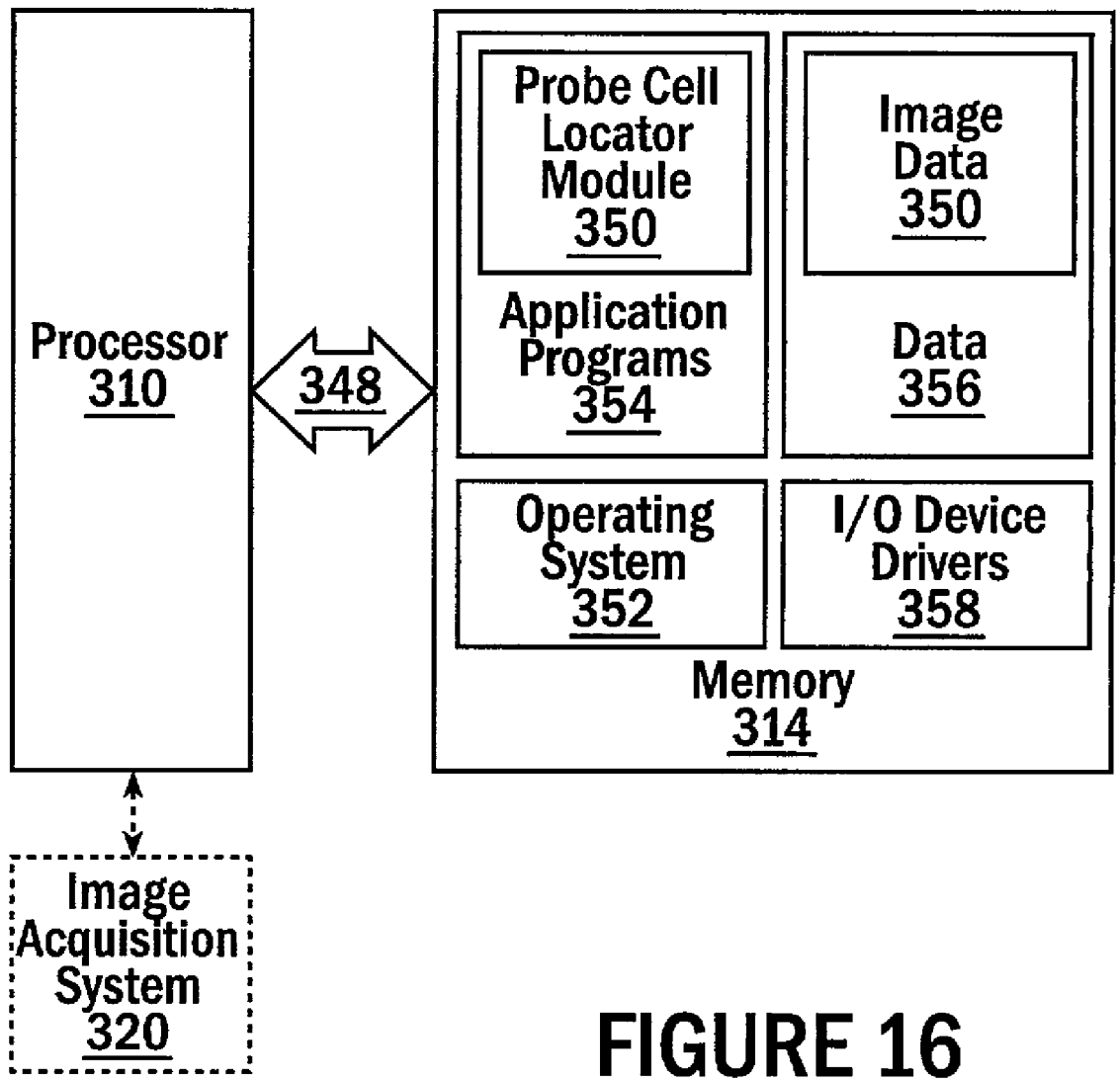
FIG. 16 is a schematic illustration of a system for estimating probe cell locations in an image according to embodiments of the present invention.

FIG. 16 is a block diagram of exemplary embodiments of data processing systems that illustrates systems, methods, and computer program products in accordance with embodiments of the present invention. The processor 310 communicates with the memory 314 via an address/data bus 348. The processor 310 can be any commercially available or custom microprocessor. The memory 314 is representative of the overall hierarchy of memory devices containing the software and data used to implement the functionality of the data processing system 305. The memory 314 can include, but is not limited to, the following types of devices: cache, ROM, PROM, EPROM, EEPROM, flash memory, SRAM, and DRAM.

As shown in FIG. 16, the memory 314 may include several categories of software and data used in the data processing system 305: the operating system 352; the application programs 354; the input/output (I/O) device drivers 358; a probe cell locator module 350; and the data 356. The data 356 may include image data 362 which may be obtained from an image acquisition system 320. As will be appreciated by those of skill in the art, the operating system 352 may be any operating system suitable for use with a data processing system, such as OS/2, AIX, OS/390 or System390 from International Business Machines Corporation, Armonk, N.Y., Windows CE, Windows NT, Windows95, Windows98 or Windows2000 from Microsoft Corporation, Redmond, Wash., Unix or Linux or FreeBSD, Palm OS from Palm, Inc., Mac OS from Apple Computer, or proprietary operating systems. The I/O device drivers 358 typically include software routines accessed through the operating system 352 by the application programs 354 to communicate with devices such as I/O data port(s), data storage 356 and certain memory 314 components and/or the image acquisition system 320. The application programs 354 are illustrative of the programs that implement the various features of the data processing system 305 and preferably include at least one application which supports operations according to embodiments of the present invention. Finally, the data 356 represents the static and dynamic data used by the application programs 354, the operating system 352, the I/O device drivers 358, and other software programs that may reside in the memory 314.

While the present invention is illustrated, for example, with reference to the probe cell locator module 350 being an application program in FIG. 16, as will be appreciated by those of skill in the art, other configurations may also be utilized while still benefiting from the teachings of the present invention. For example, the probe cell locator module 350 may also be incorporated into the operating system 352, the I/O device drivers 358 or other such logical division of the data processing system 305. Thus, the present invention should not be construed as limited to the configuration of FIG. 16, which is intended to encompass any configuration capable of carrying out the operations described herein.

In certain embodiments, the probe cell locator module 350 includes computer program code for estimating probe cell locations in the image by iteratively incrementally translating estimated probe cell locations in the image corresponding to a respective probe cell on a DNA microarray, over a localized region of the image, evaluating the intensity variation in a plurality of the estimated locations such as for each respective probe cell undergoing analysis, and selecting or identifying the probe cell location in the image based on the intensity analysis of the corresponding estimated probe cell for each probe cell undergoing analysis in locations 350.

The I/O data port can be used to transfer information between the data processing system 305 and the image scanner or acquisition system 320 or another computer system or a network (e.g., the Internet) or to other devices controlled by the processor. These components may be conventional components such as those used in many conventional data processing systems which may be configured in accordance with the present invention to operate as described herein. Additional description of exemplary biological probes and imaging systems can be found in U.S. Pat. Nos.: 5,143,854; 5,795,716; 5,631,734; 5,856,101; 5,837,832; 5,856,174; 6,090,555; and 6,141,096, the contents of which are hereby incorporated by reference as if recited in full herein.

While the present invention is illustrated, for example, with reference to particular divisions of programs, functions and memories, the present invention should not be construed as limited to such logical divisions. Thus, the present invention should not be construed as limited to the configuration of FIG. 16 but is intended to encompass any configuration capable of carrying out the operations described herein.

The flowcharts and block diagrams of certain of the figures herein illustrate the architecture, functionality, and operation of possible implementations of probe cell estimation means according to the present invention. In this regard, each block in the flow charts or block diagrams represents a module, segment, or portion of code, which comprises one or more executable instructions for implementing the specified logical function(s). It should also be noted that in some alternative implementations, the functions noted in the blocks may occur out of the order noted in the figures. For example, two blocks shown in succession may in fact be executed substantially concurrently or the blocks may sometimes be executed in the reverse order, depending upon the functionality involved.

The present invention is explained further in the following non-limiting Examples.

EXAMPLES

Figure 1:
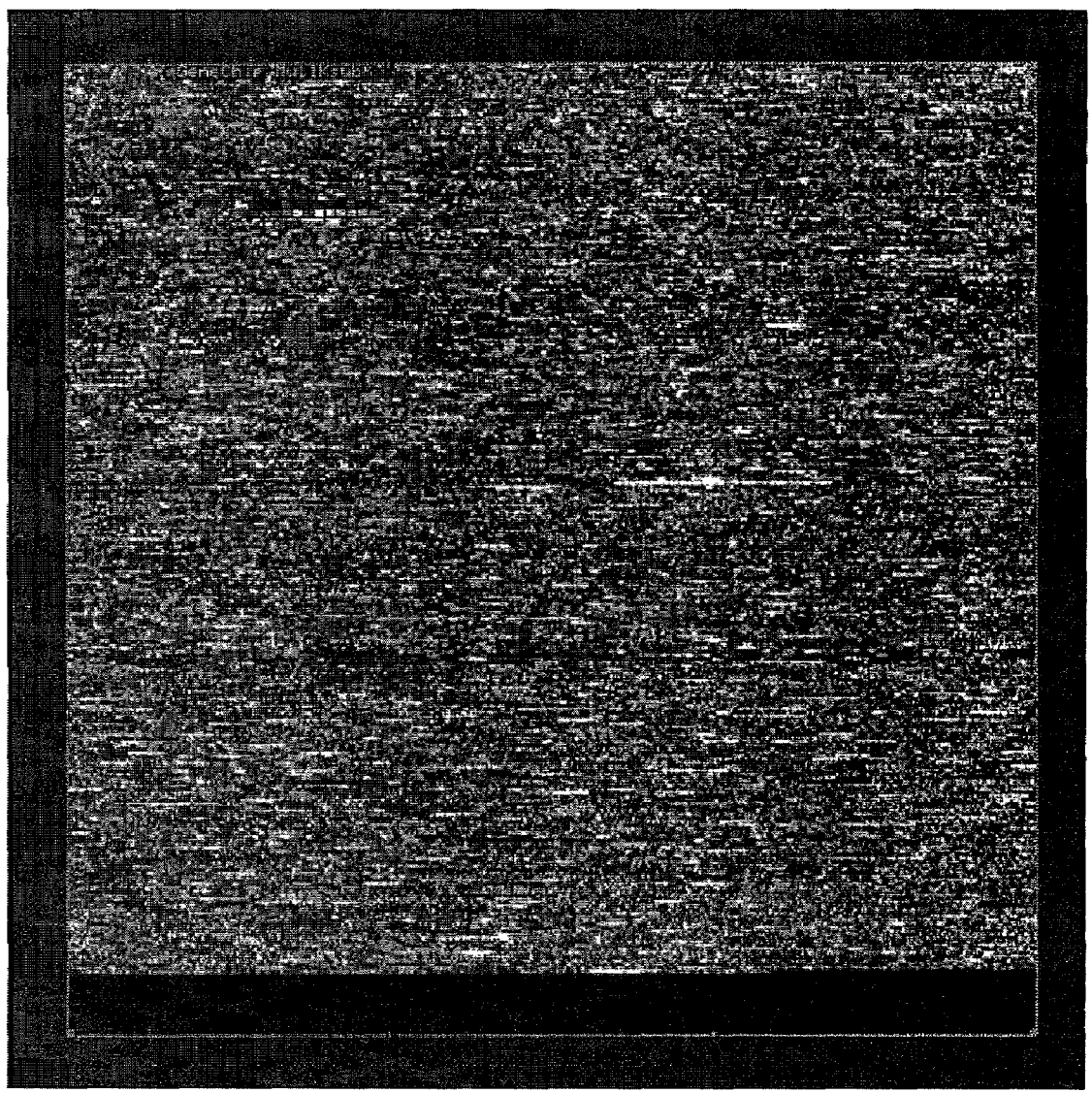
FIG. 1 is a low-resolution image of a log-transformed high-density synthetic-oligonucleotide DNA microarray.

FIG. 1 illustrates a low-resolution log-transformed image of an expressed or fluorescently labeled hybridized microarray, i.e., a post intensity scan image of (extracted) data extracted from the HSDM (i.e., after the probe array is interrogated via a scanner and the data then directed to a computer or processing system).

Figure 8:
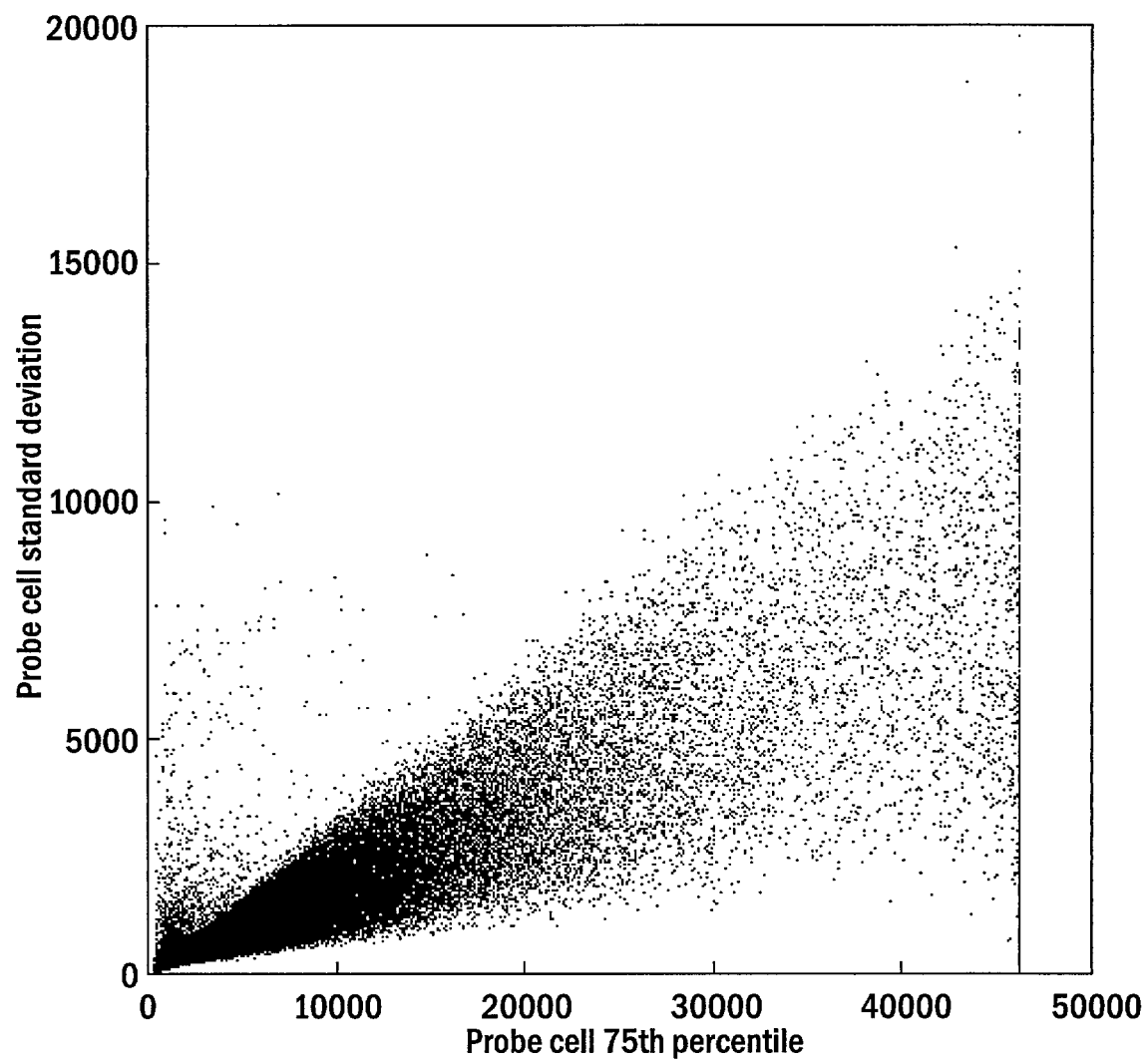
FIG. 8 is plot of standard deviations of pixels allocated to probe cells versus their $75^{th}$ percentiles.

The HSDM used to obtain the image in FIG. 1 was manufactured under the name MU11KA and contains an array of 534×534 probe cells designed to interrogate murine gene expression. The RNA used for hybridization to this HSDM was obtained from a murine tissue culture and Affymetrix's software was used to compute the hybridization summary from the extracted HSDM image. In a preliminary analysis of the hybridization summary, possible sources of error contributing to the standard deviation of pixel intensities within probe cells was investigated. FIG. 8 shows a plot of standard deviation versus 75th percentile for each of the $534^2$ probe cells. From this plot it appears that probe cells with high pixel intensities tend to have high pixel variances. The information in FIG. 8 was also used to compute the coefficient of variation with respect to the 75th percentile for each probe cell. The corresponding 534×534 array of these coefficients is presented as a grayscale image in FIG. 9. The diagonal bands in FIG. 9 reveal a spatial contribution to the coefficient of variation. This pattern may be due to poor estimates of probe cell locations. In other words, a misalignment problem may have caused pixels to be incorrectly allocated to probe cells. The present invention provides an alignment procedure that may provide improved estimates of probe cell locations, which may result in better allocation of pixel intensities to probe cells.

The observation used to produce the HDSM image in FIG. 1 was selected from a larger experiment which used 18 HSDMs and is typical of the remaining 17 observations. This image can be used as an example to illustrate the alignment algorithm and analyze the results thereof. The mathematical model described above was used to generate the estimated probe cell locations. The methods, systems, and computer program products provided by the present invention can use individual pixels as inputs.

Figure 11:
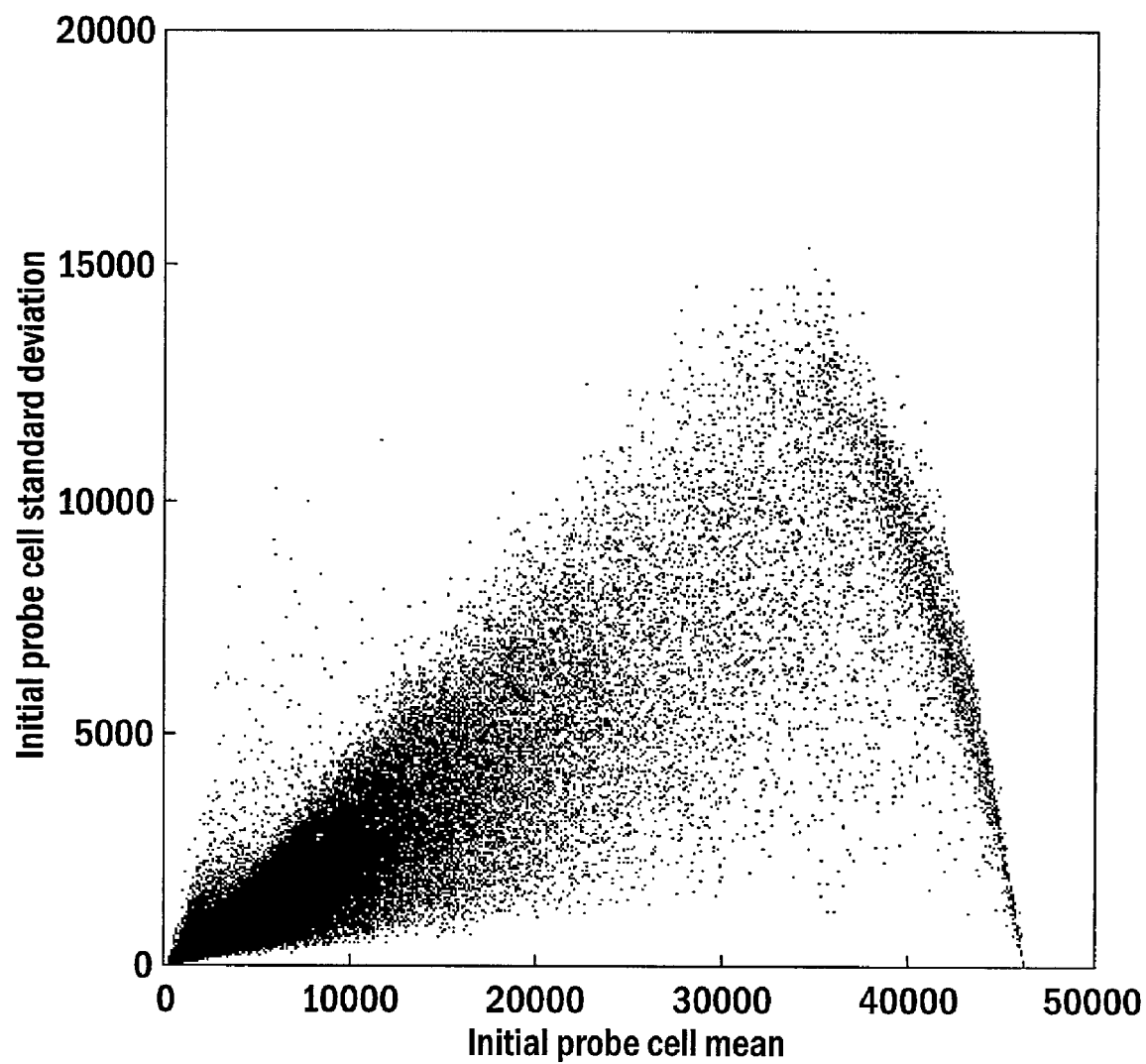
FIG. 11 is a plot of standard deviations of pixels allocated to probe cells versus their mean based on initial probe cell estimation locations.
Figure 12:
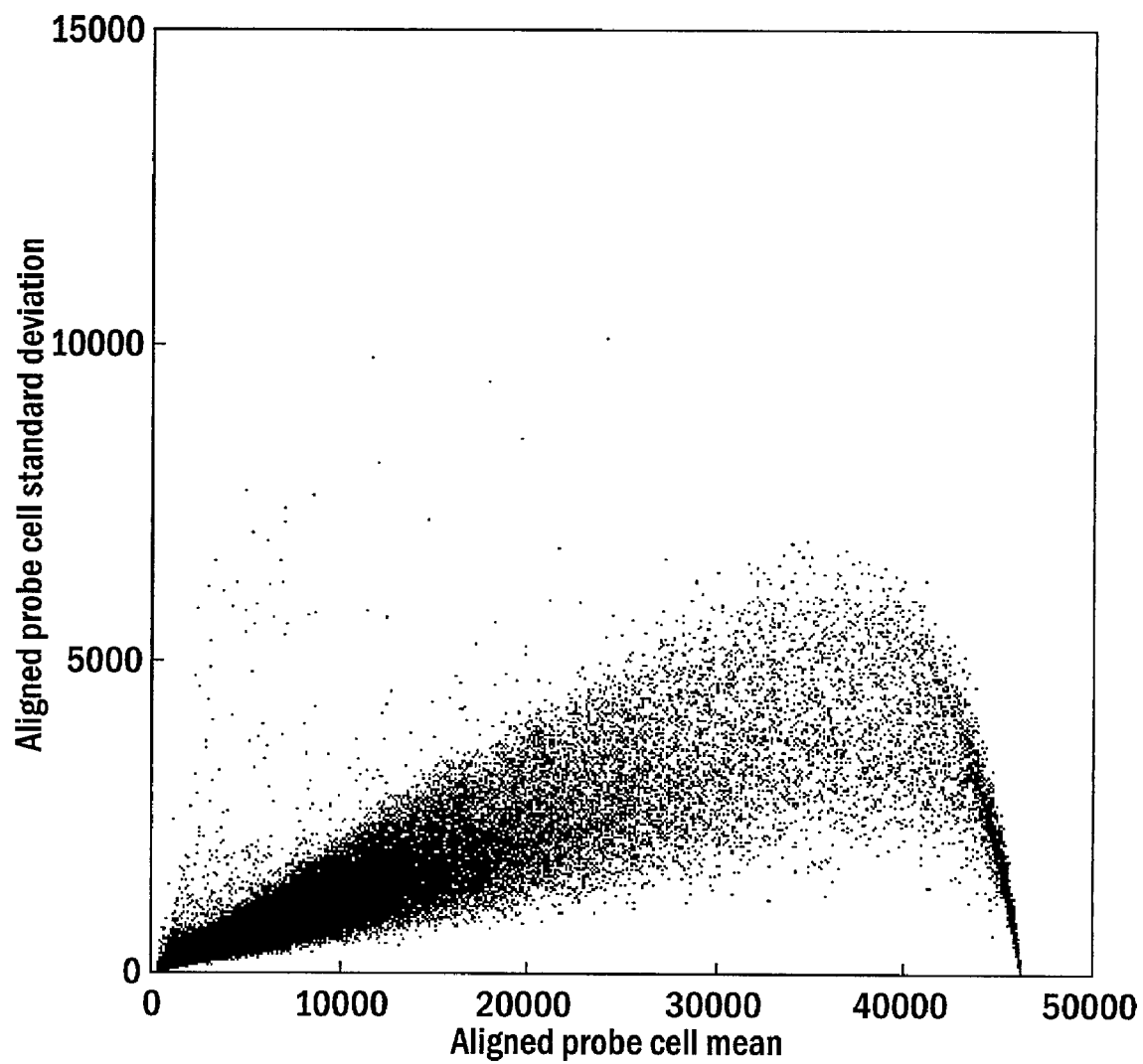
FIG. 12 is a plot of standard deviations of pixels allocated to probe cell locations versus their mean based on aligned probe cell locations according to embodiments of the present invention.
Figure 13:
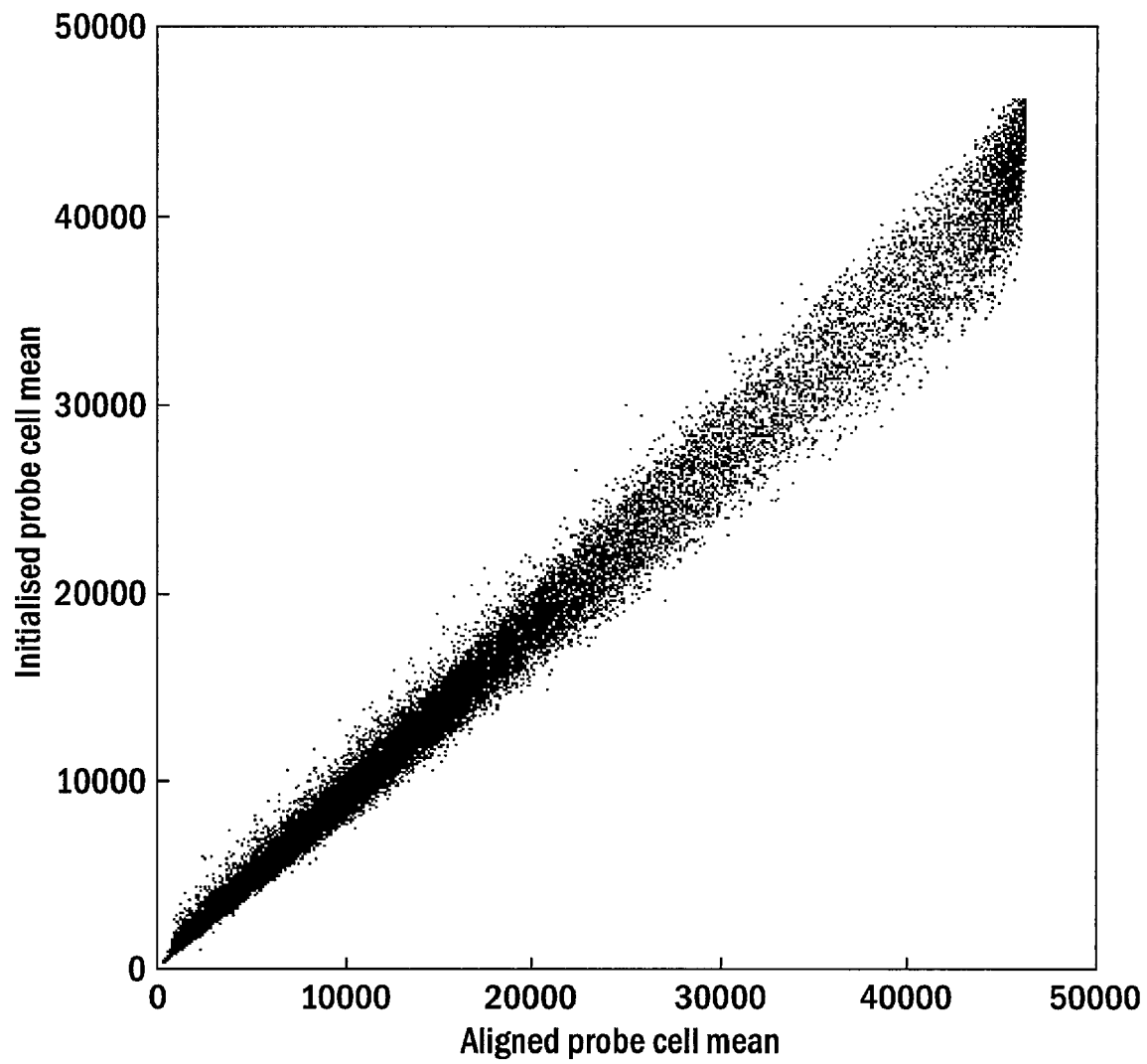
FIG. 13 is a plot of probe cell means obtained from initial estimated locations by interpolation versus probe cell means obtained from final estimated probe cell locations after alignment according to embodiments of the present invention.
Figure 14:
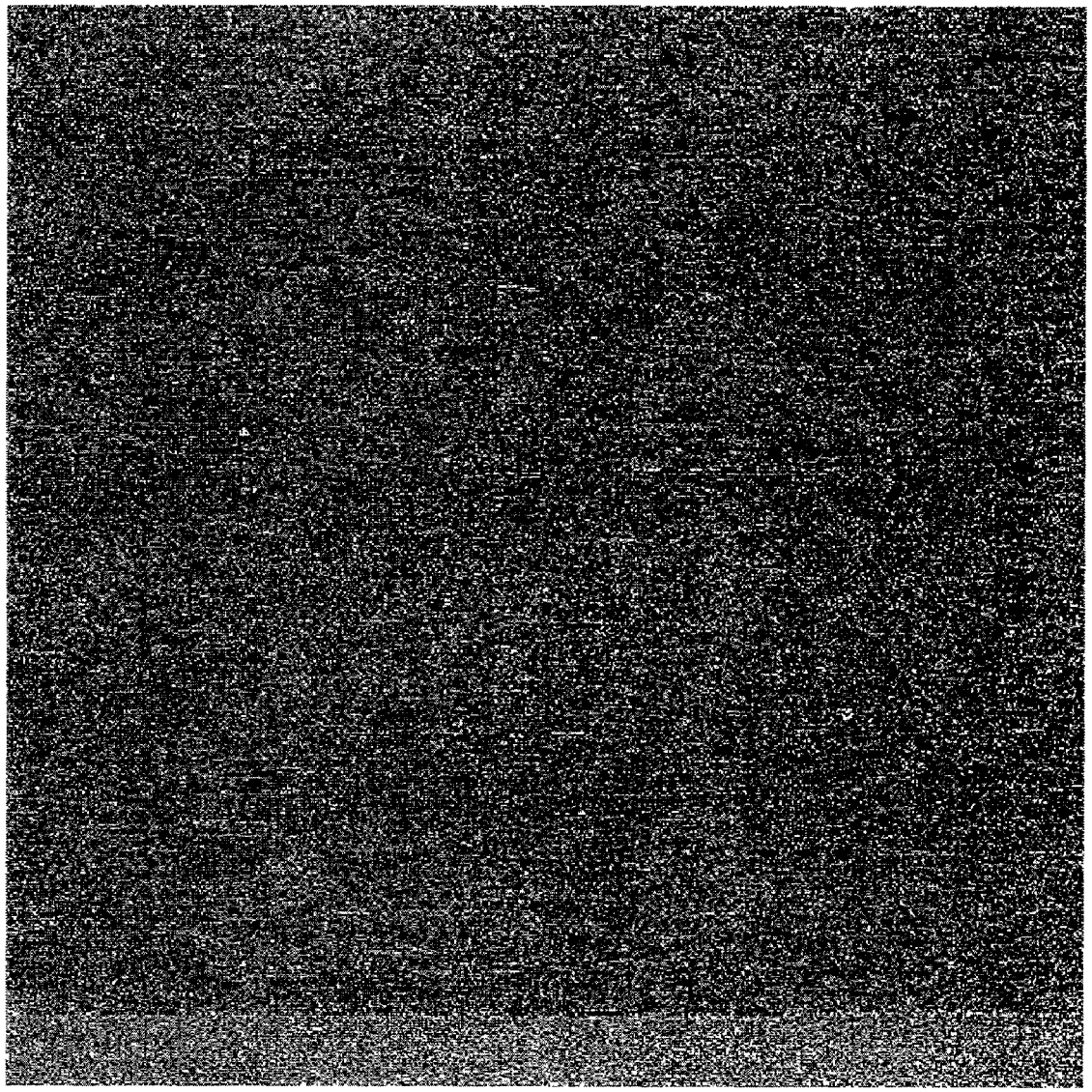
FIG. 14 is an image of which illustrates the coefficient of variation for each probe cell location after alignment of probe cell locations according to embodiments of the present invention.

Using initial probe cell locations obtained by interpolation, the mean and variance of pixel intensity in the corresponding 6×6 pixel fitting regions were computed. The mean can be used as an estimate of probe cell intensity. The scatter plot in FIG. 11 shows the standard deviation of pixel intensity versus the mean of pixel intensity in the fitting regions. The range and distribution of standard deviation along the vertical axis appears much the same as those obtained by Affymetrix's software shown in FIG. 8. FIG. 12 is the equivalent of FIG. 11 but after the alignment operations of the present invention were applied. In FIG. 12, it appears that the coefficient of variation has improved due to better estimates of probe cell locations, but a decrease in pixel variance within probe cells is an expected outcome of the application of the alignment operations and may not indicate improved alignment without corroboration. Both plots are fan shaped and further comparisons between these two plots is made difficult because the points are too numerous to be helpfully labeled. The comparison of estimated probe cell intensity prior to and after alignment is shown in FIG. 13. This plot indicates that the probe cell location does not significantly depart from its predicted region during alignment. There is a consistent transition from more conservative estimates of probe cell arithmetic means at the low end to higher estimates of probe cell arithmetic means at the high end indicating that estimates of probe cell arithmetic means may be less affected by neighboring probe cells using the aligned probe cell coordinates. The average translation of estimated probe cell centers during alignment was 1.031 pixels and the maximum was 2.685 pixels. Finally, to corroborate improved estimates of probe cell mean intensities from the alignment operations of the present invention, in FIG. 14 the coefficients of variation for each probe cell was plotted as an image providing spatial information. The only areas of this image that indicate spatial patterns in variance are where pixels are saturated and a strip at the bottom where hybridization was weak as can be seen in FIG. 1.

Figure 9:
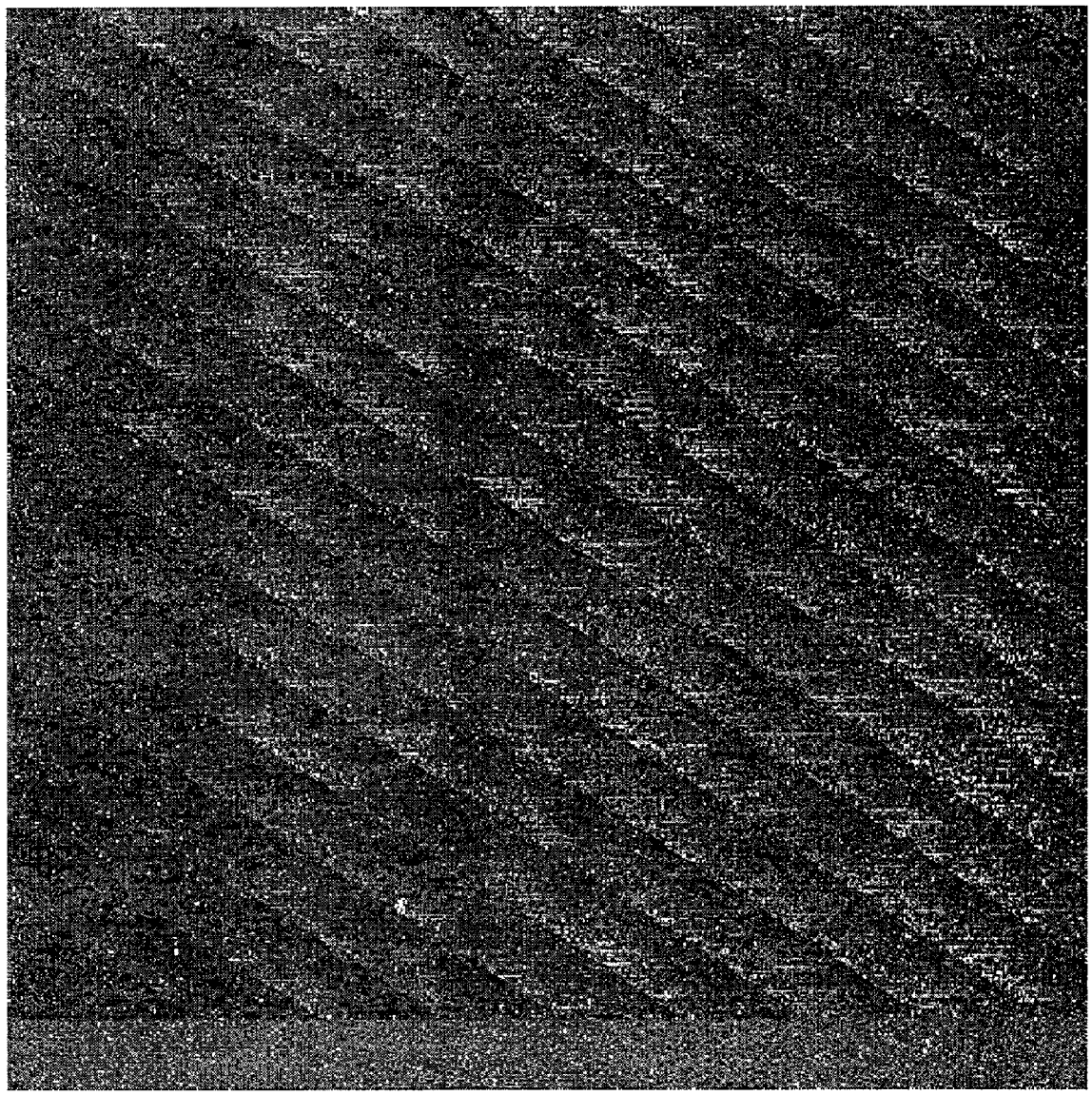
FIG. 9 is an image displaying the coefficient of variation of pixels allocated to probe cells with respect to their $75^{th}$ percentile. Low coefficients are shown as lighter squares while high coefficients are shown as darker squares.
Figure 15:
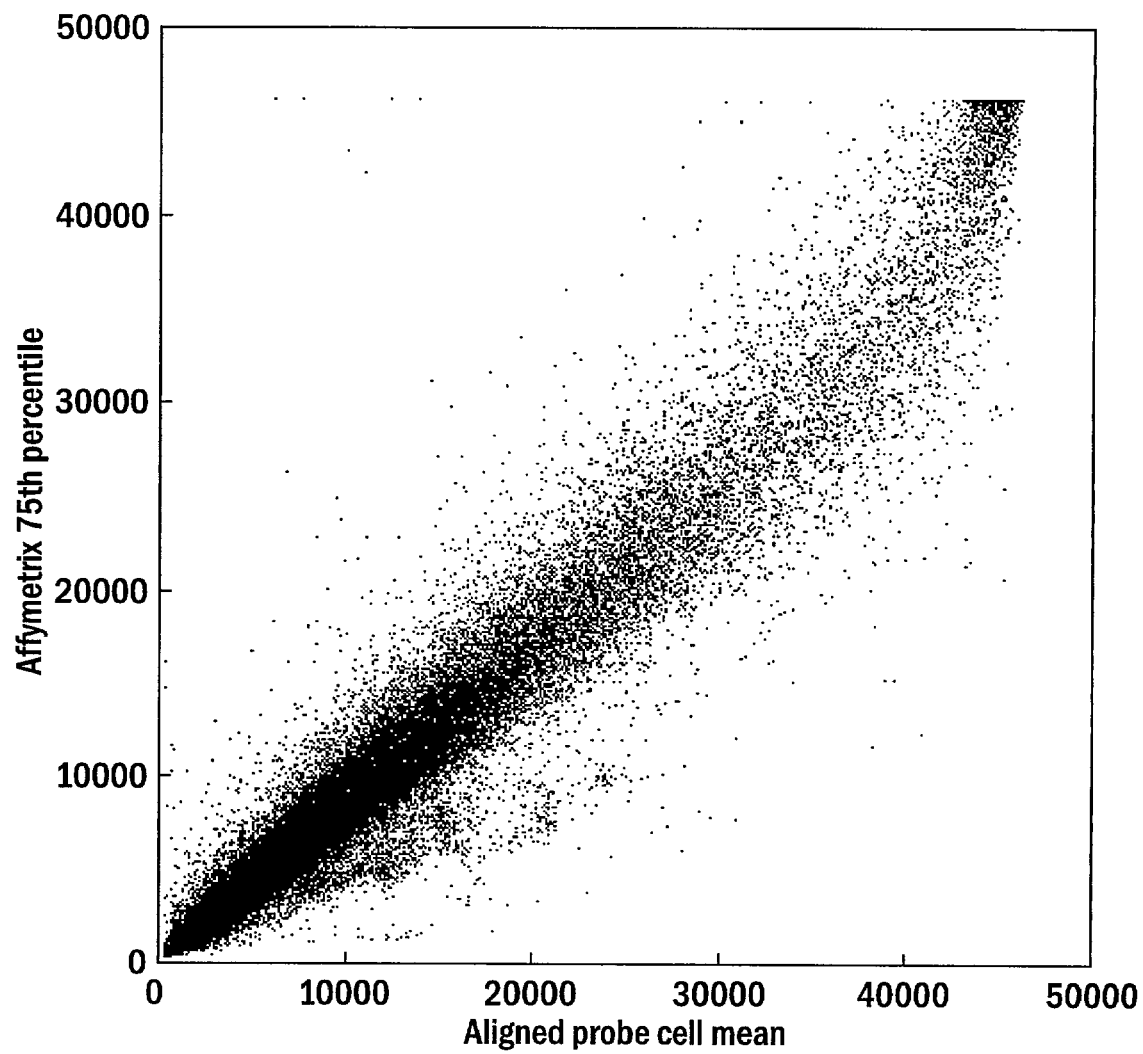
FIG. 15 is a plot of a prior art $75^{th}$ percentile probe cell location versus probe cell means estimated after the alignment estimation methods of embodiments of the present invention.

The spatial contribution to probe cell variance evident in FIG. 9 may have a substantial effect on reproducibility. A plot of Affymetrix's 75th percentiles versus post-alignment intensity mean in FIG. 15 shows that the two measures of probe cell response share a linear relationship, but in many cases the difference in probe cell response is substantial. In view of the foregoing, the alignment operations of the present invention may provide improved estimates of probe cell locations and these improved estimates may reduce the spatial contribution to pixel variance within probe cells.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses, where used, are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A method for estimating the probe cell locations in a hybridized microarray, comprising:
    obtaining an image of the intensity of a microarray having a plurality of individual probe cells;
    estimating the center of individual probe cell locations in the image to provide the first estimated locations of the centers of estimated probe cell locations; and
    for respective probe cell locations undergoing analysis:
        generating a first fitting region that has a center that coincides with the location of the first estimated center and that has a boundary that can include partial pixel volumes;
        obtaining pixel intensity data of the first fitting region;
        generating a second fitting region that has a center that is spaced apart from the center of the first fitting region by less than about one pixel, the second fitting region having a boundary that can include partial pixel volumes;
        obtaining pixel intensity data of the second fitting region;
        comparing the variance of pixel intensity from the first and second fitting regions; and
        determining the likely estimated probe cell location in the image based on the step of comparing the pixel intensity data in the first and second fitting regions.

2. A method according to claim 1, further comprising:
    generating a third fitting region that has a center which is spaced apart from the centers of the first and second fitting regions by less than about one pixel, and
    obtaining pixel intensity data of the third fitting region, and wherein the step of comparing considers the variance of the pixel intensity data within each of the first, second, and third fitting regions.

3. A method according to claim 2, wherein said first, second, and third fitting regions share a majority of the same pixels in the image.

4. A method according to claim 1, wherein the first and second fitting regions have respective centers which are spaced apart by about 0.5 pixels or less.

5. A method according to claim 1, wherein said steps of obtaining pixel intensity data from the first and second fitting regions comprises calculating partial pixel volumes of pixels dissected by the boundary of the fitting regions, and calculating pixel variance for the pixel data from the respective fitting regions.

6. A method according to claim 1, further comprising generating an array defining spaced apart potential prospective estimated center locations of a respective probe cell location undergoing analysis, wherein a plurality of fitting regions are generated, the number defined by the quantity of points in the array, a respective one fitting region corresponding to one of the estimated center locations defined by the array.

7. A method according to claim 6, wherein the array includes the first estimated center location as one of its estimated center locations, and wherein the first estimated center location can be an initial estimated center location or a subsequent current estimated location identified by said step of determining.

8. A method according to claim 7, wherein the array is a symmetrical array of evenly spaced estimated center locations.

9. A method according to claim 8, wherein the array is configured so that the first estimated center location is in the center.

10. A method according to claim 8, wherein the array is a 3×3 array.

11. A method according to claim 7, wherein the array is circular with an array center, and a plurality of prospective estimated center locations disposed circumferentially evenly spaced about the perimeter thereof.

12. A method according to claim 6, wherein the array comprises at least six discrete estimated center locations points.

13. A method according to claim 6, wherein said step of determining the estimated probe cell location, comprises interrogating each of the fitting regions associated with the prospective estimated potential probe cell center locations defined by the array, and
    assigning a first penalty value for proposed estimated probe cell locations centered at each of the proposed center locations in the array for centers being misaligned with the estimated centers of neighboring probe cell locations, the penalty being greater for greater degrees of misalignment;
    assigning a second penalty value for intensity variance within the proposed estimated probe cell locations centered at each of the proposed center locations in the array, the penalty being greater for greater degrees of variance; and determining which of the proposed estimated probe cell locations corresponding to the proposed centers in the array has the lowest penalty to thereby identify the estimated center location and the estimated probe cell location.

14. A method according to claim 13, wherein the pixel intensity variation within each estimated probe cell location defined by its corresponding fitting region having one of the proposed estimated centers of the array as its center is calculated by using log transformed intensity data averaged over the pixel area associated with the respective fitting region.

15. A method according to claim 1, wherein the first estimated center location is an initial estimated center location defined by the centroid of the centers of the neighboring probe cell locations.

16. A method according to claim 1, wherein the first and second fitting regions are the same size, share a major number of the same pixels in the image, and cover a subset of the estimated probe cell location in the image.

17. A method according to claim 1, wherein said determining step comprises considering the extent of misalignment of the estimated center location relative to the estimated center locations of its neighboring probe cell locations in the image.

18. A method according to claim 1, wherein said method further comprises logarithmically transforming the intensity data associated with the obtained pixel intensities of the first and second fitting regions.

19. A method according to claim 1, further comprising generating a relational data set that provides the average of log transformed pixel intensity data within the first and second fitting regions for a corresponding probe cell location in the image.

20. A method for estimating the probe cell locations in an image of a hybridized high-density microarray having a plurality of individual hybridized probe cells thereon, comprising:

providing a first estimated center location of a respective probe cell location in the image;

generating an array of a plurality of potential estimated center locations such that the array includes the first estimated center as one of the estimated center locations;

interrogating a plurality of estimated probe cell locations, a respective one probe cell location having a center defined by one of the plurality of potential estimated center locations in the array to obtain pixel intensity data of pixels within the estimated probe cell locations; and comparing the intensity data for each of the interrogated estimated probe cell locations to determine a likely estimated or revised estimated probe cell location.

21. A method according to claim 20, wherein said interrogating step comprises generating fitting regions having associated centers, one of which coincides with a respective one of the estimated centers of the array, the fitting regions having a size selected to sample a subset of the probe cell location in the image, the fitting regions being configured to be able to include partial pixels at their boundaries.

22. A method according to claim 21, wherein said comparing step comprises logarithmically transforming the intensity data.

23. A method according to claim 21, wherein the fitting regions are sized the same and share a major portion of the same pixels in the image.

24. A method according to claim 21, further comprising determining partial pixel volumes of the pixels dissected by the boundaries of the fitting regions and evaluating which of the proposed center estimate locations associated with the array provides the best new estimate of the center of the estimated probe cell location.

25. A method according to claim 20, wherein, the interrogated estimated probe cell locations have centers which are spaced apart by less than about 1 pixel.

26. A method according to claim 20, wherein the array is defined by a symmetrically spaced apart plurality of points.

27. A method according to claim 20, wherein said comparing step comprises analyzing the variation in the intensity of pixels associated with estimated probe cell locations.

28. A method according to claim 27, further comprising:

assigning a first penalty value for those proposed estimated probe cell locations interrogated having centers which are misaligned with neighboring probe cell locations, the penalty being greater for greater degrees of misalignment;

assigning a second penalty value for intensity variance within the proposed estimated probe cell locations, the penalty being greater for greater degrees of variance; and determining which proposed center in the array has the lowest penalty to thereby identify the new center location for the estimated probe cell location.

29. A computer program product stored in computer readable medium for estimating the probe cell locations of probe cells in an image of an expressed hybridized DNA microarray chip, the computer program product comprising:

a computer readable storage medium having computer readable program code embodied in said medium, said computer-readable program code comprising:

computer readable program code for obtaining an image of the intensities of a microarray having a plurality of individual probe cells;

computer readable program code for providing a first estimated center location of a respective probe cell location in the image;

computer readable program code for generating an array of a plurality of prospective estimated center locations for a respective probe cell such that the array includes the first estimated center as one of the estimated center locations;

computer readable program code for generating a fitting region for each of the plurality of plurality of prospective estimated center locations;

computer readable program code for interrogating the plurality of fitting regions to obtain pixel intensity data of pixels within estimated probe cell locations corresponding to the fitting regions; and computer readable program code for comparing the intensity data for each of the interrogated estimated probe cell locations to determine a likely estimated or revised estimated probe cell location.

30. A computer program product according to claim 29, wherein said computer program product further comprises computer readable program code for carrying out the interrogation by generating fitting regions having associated centers, one of which coincides with a respective one of the estimated centers of the array, the fitting regions having a size selected to sample a subset of the probe cell location in the image, the fitting regions being configured to be able to include partial pixels at their boundaries.

31. A computer program product according to claim 30, wherein said computer program product further comprises computer readable program code for determining partial pixel volumes of the pixels dissected by the boundaries of the fitting regions and evaluating which of the proposed center estimate locations associated with the array provides the best new estimate of the center of the estimated probe cell location.

32. A computer program product according to claim 29, wherein said computer program product further comprises computer readable program code for logarithmically transforming the intensity data of individual probe cells undergoing analysis.

33. A computer program product according to claim 32, wherein the potential estimated centers so as to be spatially offset from the another estimated center location in the array by less than one pixel.

34. A computer program product according to claim 29, wherein the perimeter of the fitting regions may dissect pixels, and wherein the computer program code for interrogating the plurality of fitting regions to obtain pixel intensity data can consider partial pixel volumes.

35. A computer program product according to claim 29, wherein said computer program product further comprises computer readable program code for calculating and analyzing the variation in the intensity of pixels associated with estimated probe cell locations.

36. A computer program product according to claim 29, wherein said computer program product further comprises computer readable program code for assigning a first penalty value for those proposed estimated probe cell locations interrogated having centers which are misaligned with neighboring probe cell locations, the penalty being greater for greater degrees of misalignment, computer readable program code for assigning a second penalty value for intensity variance within the proposed estimated probe cell locations, the penalty being greater for greater degrees of variance; and computer readable program code for determining which proposed center in the array has the lowest penalty to thereby identify the new center location for the estimated probe cell location.

37. A system for estimating probe cell location in an image of a hybridized DNA array, comprising:

a processor; and computer program code for estimating probe cell locations in an image of a hybridized microarray comprising, for a respective probe cell location in an image, interrogating a plurality of estimated probe cell locations by generating first and second fitting regions having centers which are spaced apart by less than about one pixel, the first and second fitting regions being able to include partial pixels at their boundaries, analyzing the pixel intensity variance within each of the first and second fitting regions, and selecting the potential estimated location for that probe cell based thereon.

* * * * *